United States Patent (10) Patent No.: US 11,622,617 B2
Schär et al. (45) Date of Patent: Apr. 11, 2023

(54) METHOD FOR PRODUCING BRUSHES, IN PARTICULAR INTERDENTAL BRUSHES, AND BRUSH, IN PARTICULAR INTERDENTAL BRUSH, AND PRODUCT GROUP COMPRISING A PLURALITY OF BRUSHES

(71) Applicant: TRISA HOLDING AG, Triengen (CH)

(72) Inventors: Michael Schär, Egolzwil (CH); Peter Zurfluh, Alpnach Dorf (CH)

(73) Assignee: TRISA HOLDING AG, Triengen (CH)

( * ) Notice: Subject to any disclaimer, the term of this patent is extended or adjusted under 35 U.S.C. 154(b) by 483 days.

(21) Appl. No.: 16/396,044

(22) Filed: Apr. 26, 2019

(65) Prior Publication Data
US 2019/0246778 A1 Aug. 15, 2019

Related U.S. Application Data

(63) Continuation of application No. 14/410,536, filed as application No. PCT/EP2013/001412 on May 14, 2013, now Pat. No. 10,299,577.

(30) Foreign Application Priority Data

Jul. 2, 2012 (EP) .................................... 12004914

(51) Int. Cl.
*A46B 1/00* (2006.01)
*A46B 5/02* (2006.01)
(Continued)

(52) U.S. Cl.
CPC ................ *A46B 1/00* (2013.01); *A46B 3/005* (2013.01); *A46B 5/02* (2013.01); *A46B 5/026* (2013.01);
(Continued)

(58) Field of Classification Search
CPC ........... A46B 1/00; A46B 3/005; A46B 5/021; A46B 5/026; A46B 9/04; A46B 2200/108
See application file for complete search history.

(56) References Cited

U.S. PATENT DOCUMENTS 2,225,331 A 12/1940 Campbell
3,302,230 A 2/1967 Poppelman
(Continued)

FOREIGN PATENT DOCUMENTS

CH 296 417 A 2/1954
DE 941364 C 4/1956
(Continued)

OTHER PUBLICATIONS

U.S. Appl. No. 13/978,480, filed Jul. 5, 2013 in the name of Kirchhofer et al.
(Continued)

*Primary Examiner* — Laura C Guidotti
(74) *Attorney, Agent, or Firm* — Oliff PLC

(57) ABSTRACT

The invention relates to a brush, in particular an interdental brush, which comprises a bristle-carrying stem defining a longitudinal direction and having an elongate support core, a bristle area having bristles projecting from the bristle-carrying stem, and a neck element connecting the support core to a handle, wherein the handle, the support core and the neck element are injection moulded integrally from a first plastics component, and wherein a second plastics component in the form of an integral layer and the bristles projecting therefrom is mounted on the support core. The invention also relates to corresponding product groups and to a corresponding method.

19 Claims, 18 Drawing Sheets

(51) Int. Cl.
*A46B 3/00* (2006.01)
*A46D 3/00* (2006.01)
*B29K 21/00* (2006.01)
*B29K 101/12* (2006.01)
*B29L 31/42* (2006.01)
*B29C 45/16* (2006.01)
*B29C 45/26* (2006.01)
*B29C 45/27* (2006.01)
*A46B 9/02* (2006.01)
*A46B 15/00* (2006.01)
*B29C 45/14* (2006.01)

(52) U.S. Cl.
CPC .............. *A46D 3/00* (2013.01); *A46B 9/02* (2013.01); *A46B 15/0093* (2013.01); *A46B 15/0095* (2013.01); *A46B 2200/108* (2013.01); *B29C 45/14065* (2013.01); *B29C 45/1671* (2013.01); *B29C 45/1676* (2013.01); *B29C 45/2626* (2013.01); *B29C 45/2708* (2013.01); *B29K 2021/003* (2013.01); *B29K 2101/12* (2013.01); *B29L 2031/42* (2013.01)

(56) References Cited

U.S. PATENT DOCUMENTS

| | | | |
|---|---|---|---|
| 3,698,405 | A | 10/1972 | Walker |
| 4,635,313 | A | 1/1987 | Fassler et al. |
| 5,497,526 | A | 3/1996 | Klinkhammer |
| 5,775,346 | A | 7/1998 | Szyszkowski |
| D416,685 | S * | 11/1999 | Overthun ............... D4/104 |
| 6,085,761 | A | 7/2000 | Inaba |
| 6,158,444 | A | 12/2000 | Weihrauch |
| 6,292,973 | B1 | 9/2001 | Moskovich et al. |
| 6,464,920 | B1 * | 10/2002 | Kramer ............... B29C 45/16 264/243 |
| 6,767,209 | B1 * | 7/2004 | Tomita ............... B29C 45/2626 433/216 |
| 6,859,969 | B2 | 3/2005 | Gavney, Jr. et al. |
| 7,047,589 | B2 | 5/2006 | Gavney, Jr. |
| 7,182,542 | B2 | 2/2007 | Hohlbein |
| 7,281,768 | B2 | 10/2007 | Sato et al. |
| D637,817 | S | 5/2011 | Smith |
| 8,109,686 | B2 | 2/2012 | Bartschi et al. |
| 8,851,781 | B2 | 10/2014 | Bartschi et al. |
| 8,893,344 | B2 | 11/2014 | Boucherie |
| 9,402,700 | B2 | 8/2016 | Patel et al. |
| 10,299,577 | B2 * | 5/2019 | Schar ............... B29C 45/2626 |
| 2003/0163884 | A1 | 9/2003 | Weihrauch |
| 2005/0006819 | A1 | 1/2005 | Weihrauch |
| 2005/0034740 | A1 | 2/2005 | Eckers et al. |
| 2005/0172439 | A1 | 8/2005 | Weihrauch |
| 2006/0085931 | A1 | 4/2006 | Roberts et al. |
| 2006/0230563 | A1 | 10/2006 | Gavney, Jr. |
| 2007/0101525 | A1 | 5/2007 | Hohlbein |
| 2008/0307596 | A1 | 12/2008 | Hohlbein |
| 2009/0230756 | A1 | 9/2009 | Crossman |
| 2010/0024839 | A1 | 2/2010 | Kalbfeld et al. |
| 2010/0300475 | A1 | 12/2010 | Gueret |
| 2011/0041271 | A1 | 2/2011 | Huang |
| 2011/0239387 | A1 * | 10/2011 | Hohlbein ........... A46B 11/0065 15/104.93 |
| 2014/0158152 | A1 | 6/2014 | Butz et al. |
| 2015/0114428 | A1 | 4/2015 | Kato |

FOREIGN PATENT DOCUMENTS

| | | |
|---|---|---|
| DE | 18 62 043 U | 11/1962 |
| DE | 102 35 642 A1 | 2/2004 |
| DE | 20 2007 014 474 U1 | 3/2009 |
| DE | 10 2012 025 039 A1 | 6/2014 |
| EP | 0 952 571 A2 | 10/1999 |
| EP | 1 147 750 A1 | 10/2001 |
| EP | 1 258 227 A2 | 11/2002 |
| EP | 1 911 414 A2 | 4/2008 |
| EP | 2 030 524 A1 | 3/2009 |
| EP | 2 857 167 A1 | 4/2015 |
| EP | 2 882 313 B1 | 11/2016 |
| FR | 2 943 898 A3 | 10/2010 |
| JP | 2012-152928 A | 8/2012 |
| WO | 98/16169 A1 | 4/1998 |
| WO | 02/28222 A1 | 4/2002 |
| WO | 03/079849 A1 | 10/2003 |
| WO | 2004/113047 A1 | 12/2004 |
| WO | 2007/005753 A2 | 1/2007 |
| WO | 2007/076405 A1 | 7/2007 |
| WO | 2008/135953 A1 | 11/2008 |
| WO | 2008/146968 A1 | 12/2008 |
| WO | 2009/072747 A1 | 6/2009 |
| WO | 2012/110226 A1 | 8/2012 |
| WO | 2013/176297 A1 | 11/2013 |
| WO | 2014/023424 A1 | 2/2014 |

OTHER PUBLICATIONS

Oct. 10, 2012 International Search Report issued in International Patent Application No. PCT/EP2012/000009.
Jul. 10, 2013 International Preliminary Report on Patentability issued in International Patent Application No. PCT/EP2012/000009.
Nov. 17, 2016 Office Action issued in U.S. Appl. No. 14/410,536.
Jun. 22, 2016 Office Action issued in U.S. Appl. No. 13/978,480.
Jan. 19, 2017 Office Action issued In U.S. Appl. No. 13/978,480.
Nov. 12, 2013 International Search Report issued in International Patent Application No. PCT/EP2013/001412.
Mar. 4, 2016 Search Opinion issued in European Patent Application No. 15 179 848.5.
Aug. 24, 2017 Office Action issued in European Patent Application No. 15 179 848.5.
Dec. 21, 2017 Third Party Observations issued in European Patent Application No. 15 179 848.5.
Feb. 19, 2018 Office Action issued in European Patent Application No. 13 725 569.1.
Feb. 23, 2018 Office Action issued in European Patent Application No. 15 179 848.5.
Mar. 22, 2019 Summons to Oral Proceedings issued in European Patent Application No. 15179848.5.
Jan. 11, 2019 Third Party Observations submitted in European Patent Application No. 15179848.5.
Jun. 24, 2011 German Design Publication 402011000831-0017.
Jun. 24, 2011 German Design Publication 402011000831-0019.
Apr. 30, 1993 French Design Publication 930114-001.
May 12, 2017 Office Action issued in U.S. Appl. No. 14/410,536.
Nov. 27, 2017 Office Action issued in U.S. Appl. No. 14/410,536.
Jul. 27, 2018 Office Action issued in U.S. Appl. No. 14/410,536.

\* cited by examiner

METHOD FOR PRODUCING BRUSHES, IN PARTICULAR INTERDENTAL BRUSHES, AND BRUSH, IN PARTICULAR INTERDENTAL BRUSH, AND PRODUCT GROUP COMPRISING A PLURALITY OF BRUSHES

This is a Continuation of application Ser. No. 14/410,536, filed Dec. 22, 2014, which in turn is a National Stage of International Application No. PCT/EP2013/001412, filed on May 14, 2013, which claims priority to European Application No. 12004914.3, filed on Jul. 2, 2012. The disclosures of the prior applications are hereby incorporated by reference herein in their entirety.

The present invention relates to a method for producing a brush, in particular an interdental brush, using the injection molding method according to disclosed embodiments, to a brush, in particular an interdental brush according to disclosed embodiments and to a product group consisting of several brushes according to disclosed embodiments.

Document U.S. Pat. No. 3,698,405 discloses toothpicks having a plastics material or metal stick, a rubber sponge casing being fastened over the entire length of the stick. Nubs can protrude from the surface of the rubber sponge. The rubber sponge is to comprise at least 70% air. In the case of a further embodiment, the rubber or rubber sponge is fastened to the stick only over a short distance at the ends thereof.

Document WO 98/16169 discloses an interdental cleaner which consists of an elongated, stick-shaped carrier produced from a first plastics material component which is overlapped in part regions of its surface by at least one insert or support produced from a second plastics material component which is softer than the first plastics material. In this case, the insert can be arranged in a recess which is realized in the carrier and can be held in a positive locking manner with said recess. If the first plastics material component of the carrier and/or the second plastics material component of the insert or support includes one or several additives, the cleaning and care effect can be varied and optimized. To produce an interdental cleaner of this type, the second plastics material component of the insert or support is injected onto the first plastics material component of the carrier, it being possible to produce the carrier and the insert or support using a two-component injection molding method.

In addition, a cleaning instrument for a tooth root canal known from document EP 1 258 227 A includes a head portion and a cleaning portion which connects thereto and has a shaft which is provided with bristles on its outer surface. The shaft is realized integrally with the bristles so that in particular the tooth root canal is able to be cleaned reliably with the cleaning instrument.

In addition, document WO 2008/146968 A discloses a method and a mold to produce a mascara brush. The mold comprises an upper mold box and a lower mold box which together, as a result of molding, in the closed state form cavities for producing the application heads. A wick produced from ceramics or plastics material is inserted into the lower mold box per mascara brush and once the upper and lower mold boxes have been moved together, a soft material is injected into the cavities. To this end the mold comprises a pressure plate which interacts with the upper mold box, feed passages leading from the space formed by the pressure plate and the upper mold box through the upper mold box into the cavities. Material which is liquefied under pressure, is inserted between the pressure plate and the upper mold box. The material is liquefied as a result of moving the pressure plate and the mold box toward one another and the liquid material is pressed through the connecting openings into the cavities.

It is an object of the present invention to propose a particularly simple injection molding method for producing a brush, in particular an interdental brush which comprises a bristle-carrying stem, which defines a longitudinal direction and has an elongated support core and a bristle field with bristles which protrude from the bristle-carrying stem, a correspondingly produced brush, in particular an interdental brush, as well as a product group produced from several brushes.

Along with interdental brushes, the brushes can be in particular mascara brushes, medical brushes, cosmetic brushes, body care brushes, cleaning brushes, domestic brushes etc.

Said object is achieved with a method according to disclosed embodiments, a brush according to disclosed embodiments and a product group according to disclosed embodiments.

Particularly preferred embodiments are provided in the dependent claims.

The solution according to the invention includes a method for producing a brush, in particular an interdental brush which comprises a bristle-carrying stem, which defines a longitudinal direction and has an elongated support core, a bristle field with bristles which protrude from the bristle-carrying stem and a neck element which connects the support core to a handle, having the following steps: inject the handle, the neck element and the support core integrally from a first plastics material component, introduce the support core in the longitudinal direction through a bristle field cavity opening of an injection mold into a bristle field cavity, fix the support core introduced into the bristle field cavity to avoid movement of the support core in the longitudinal direction and apply a second plastics material component from an injection point of the injection mold onto the support core for realizing a layer on the support core and the bristles protruding therefrom in an integral manner; as well as a brush, in particular an interdental brush, comprising a bristle-carrying stem, which defines a longitudinal direction and has an elongated support core, a bristle field with bristles which protrude from the bristle-carrying stem and a neck element which connects the support core to a handle, wherein the handle, the support core and the neck element are injected integrally from a first plastics material component, and wherein a second plastics material component in the form of an integral layer and the bristles protruding from said layer is applied onto the support core. The solution according to the invention also includes a product group comprising several brushes, in particular interdental brushes, wherein the handles of the adjacent brushes are connected in each case by means of one, preferably by means of two, material bridges produced from the first plastics material component as well as a product group comprising several brushes, in particular interdental brushes, wherein the handles of the adjacent brushes are connected in each case by means of a material bridge produced from the first plastics material component and a material bridge produced from the second plastics material component.

A product group consists of three to eight products which are arranged together and preferably of five to six products. For reasons of simplicity, the figures are shown in each case with only five products.

In addition, the solution according to the invention includes a method for producing a brush, in particular an interdental brush which comprises a bristle-carrying stem, which defines a longitudinal direction and has an elongated support core, a bristle field with bristles which protrude from the bristle-carrying stem and a neck element which connects the support core to a handle, having the following steps: inject the handle, the neck element and the support core integrally from a first plastics material component, move the injected part into a further cavity of an injection mold with bristle cavities, fix the part introduced into the bristle field cavity to avoid movement of the support core in the longitudinal direction, and apply a second plastics material component from an injection point of the injection mold onto the support core for realizing a layer on the support core and the bristles protruding therefrom in an integral manner.

The moving in the injection mold preferably occurs using a transport bar which, after a lifting movement, moves the at least partially finished products out of the cavity, as a result of a translatory displacement or a rotation, to a further cavity where they are placed in the cavity by means a stroke.

The transport bar is preferably part of the cavity, this means that the transport bar forms part of the forming geometry at least in the first injection molding operation. The interface between the product and the transport system can be arranged, for example, in the handle or in the neck or as a combination therefrom.

The often desired individualization of the product can be achieved in the handle and in the neck, for example, by exchangeable shaping parts. For example, lettering or other surface geometries can be formed in this way. Said elements can be arranged both in the transport bar and in the actual cavity.

The production process of the named products is ended after the injection molding insofar as usable products are present. The product can be packaged correspondingly after the injection molding.

The products are preferably packaged in a packaging which is available to the consumer as a box. The products are arranged therein in a horizontal manner or abutting against one another vertically.

The connecting of the packaging process can be effected inline, i.e. interlinked or offline in a separate step. In the case of the inline process, the injection molding and the packaging are coupled. The products are not removed out of the machine until they are completely packaged. In the case of the offline process, the products are stored, transported, etc. after the injection molding process, rather than being packaged beforehand.

In addition, it is possible to carry out intermediate steps after the injection molding and prior to the packaging. For example, buffering or treating the product, for example as a result of coating (spraying, dipping, etc.).

A hard plastics material is preferably used as the first plastics material component from which the handle, the support core and the hard element are integrally formed and a soft component is preferably used for the second plastics material component from which the layer or the bristles protruding from the same are formed. It is naturally also possible for a further third component to be used, for example in the region of the handle, to increase the grip and to improve the ergonomics, or else also in the region of the bristle field in the form of further cleaning elements or other functional elements. Examples of the materials that are possible in this context are provided further below in the general description part.

With regard to the product groups according to the invention, it is noted that in principle each product can be produced in an individual cavity and each product can be accommodated individually in the sales unit. In general, several products are preferably arranged side by side and the connection between the products is effected by means of material bridges in the handle region. The longitudinal axes of the brushes are preferably arranged in parallel. As a rule, one, two or three material bridges are provided (however more are conceivable). Said material bridges impart stability above all to the product groups. The products are separated additionally at the material bridges for use. Since, when the individual brushes are separated off, edges which could injure fine tissue, such as the oral mucosa, can be created, the material bridges are regularly arranged in the handle. The material bridges are preferably produced in each case from the same component. It is also possible for two different or several different components to be used, one each being used per material bridge. This depends, however, on the chosen injection point, only one injection point being used for each component preferably per product group. In a further preferred manner, one material bridge is arranged rather in the front part and the other rather in the rear part of the handle so that a sufficient distance is ensured between the material bridges. The material bridges can be formed in a rectangular or oval manner in cross section and the cross section preferably has a longer and a shorter length and the longer length of the cross section preferably lies in the direction of the longitudinal axis of the product. The material bridges can additionally include elements for support during the separating operation such as, for example, notches or perforations as predetermined breaking points. With regard to the product development, it has proved expedient to provide the identical materials and identical geometries for all the products of a product group. However, it is also possible to develop the products in a different manner, in this case the forms of the cleaning tips can vary somewhat. Different diameters, different length of the cleaning tips and different overall lengths of the brushes can be provided. With regard to the material, variation can be undertaken in the case of the second component (i.e. the soft component).

In a preferred embodiment of the present invention, the second plastics material component surrounds the preferably bristle-free neck element at most in part.

This depends in each case on the choice of injection points, however embodiments are also possible where the neck element is completely encased by the second component.

In a further preferred embodiment of the present invention, the support core, the neck element and the handle are injected in a cavity of the injection mold that is separate from the bristle field cavity.

In this way the production process can be developed more efficiently than if a completely different injection mold has to be used for this purpose.

In yet another preferred embodiment of the present invention, the layer is realized in such a manner that it forms a casing of the support core in the region of the bristle stem.

A particularly good and secure seat can be achieved on the support core by means of such a casing. In particular, with regard to its shrinkage, the second component can also be chosen such that it shrinks onto the support core.

In another preferred embodiment of the present invention, the support core is centered in the bristle field cavity by means of bristle field mold parts, preferably by means of support elements which protrude in the direction toward the interior of the bristle field cavity, at several support points which are spaced apart from one another in the longitudinal direction.

The support points are preferably arranged between the bristles.

In this way, the support core can be effectively prevented from moving in the radial direction (i.e. away from the longitudinal axis) and where applicable from closing the openings for the bristles to be formed.

In yet another preferred embodiment of the present invention, the fixing of the support core is effected in the region of the handle preferably at points at which only one plastics material component is present.

In this way, a second, possibly softer plastics material component should be prevented from being damaged by the fixing agent.

In a further preferred embodiment of the present invention, the first and second plastics material components consist of a hard material, a hard material and a semi-hard material or else a hard material and a soft material.

The material combinations chosen in each case depend on the specific application and the materials used are given specifically further below in the general description part. For example, a PE/PE material pairing is possible for the hard/semi-hard combination, an HDPE being used for the first material component and an LLDPE being used for the second material component. A PP/TPE material pairing is possible for the hard/soft combination.

The materials used can be water-soluble and edible and thus, for example, be formed completely or in part from hydrocolloids, starches, gum arabic, polyvinyl alcohol or Polyox.

In addition, it is possible as a further component, to spray on a material or to dip the existing product in a bath and thus apply a further component, for example as a coating.

Means which can be used as a coating or as constituents for the abovementioned materials are, for example, color, flavor, tooth-cleaning fluid, toothpaste and active substances.

In addition, the support core preferably comprises a smaller diameter than the neck element.

This ensures that the support core is not too thick at its front end for use in the interdental area.

In a preferred manner, in addition, the layer is injected or applied onto the support core so as to be flush with the neck element.

The flush closure of the layer with the neck element is more pleasing to handle and offers a more advantageous development visually.

In another preferred embodiment of the present invention, the injection point of the second plastics material component is situated on the front end of the handle, the end facing the neck element.

In principle, the choice of the injection point is determined by the development of the product, the shot weight and the possibilities of the processing machine. Both hot runner and cold runner systems can be used. In the case of classic injection molds with a cold runner system, the gating system is not insulated thermally from the rest of the mold. Consequently, both the mold and the gating system located therein are tempered at temperatures clearly below the processing temperatures of the plastics. As a result, the thermoplastic material also solidifies in the gating system during the production of a component.

In the case of a hot runner system the gating system is separated thermally from the rest of the mold and is separately heated such that the plastic melt in the gating system remains flowable. As a result, the plastics material does not solidify in the gating system and no sprue remains on the component. In addition, longer flow paths can also be realized as a result of the hot runner systems because the pressure loss in the gating system is not increased by cooling of the melt or the rise in viscosity connected thereto.

On account of the above-mentioned choice of the injection point, the plastics material component of the casing on the handle overlaps a small part of the surface, whilst, on the rear side of the interdental brush, on the neck element, it covers a considerable part of the surface of one side before it finally covers the surface in the bristle field portion completely. The parts injected from the first plastics material component (handle, neck element and support core) comprise, where applicable, corresponding troughs or channels which enable or support the flowing of the second plastics material component. Reverse injection molds are used in each case in a corresponding manner. The injection nozzle, in the case of said embodiment, is arranged in the handle cavity and a hot runner system is preferably used on account of the flow path.

In yet another preferred embodiment of the present invention, the injection point of the second plastics material component is situated at the exposed end of the support core or at the end of the support core facing the neck element.

If the injection point is arranged at the exposed end of the support core, a separate injection point is provided for each brush. A cold runner system is used as a rule in this connection, additional means being provided in the mold or during post-processing for separating the product from the sprue. In general, punches or cutters are possible as separating means. The injection nozzles are consequently arranged in each case in the bristle field cavity and both tunnel-gating and film-gating or other known gating types can be used.

In yet another preferred embodiment of the present invention, the injection point of the second plastics material component is situated on the rear end of the handle, the end remote from the neck element.

In this case, the injection nozzle is once again arranged in the handle cavity. As a rule, a hot runner system is used on account of the relatively long flow path. In this case, the second plastics material component overlaps a large part of the surface of the handle as well as, on the rear side of the interdental brush, on the neck element, a considerable part of the surface of one side before it once again completely covers the surface in the bristle field portion.

The second plastics material component, in this case, is received in corresponding troughs or in a hole in the handle where it forms a portion with increased grip.

A corresponding trough in the handle can be provided with a structure such as, for instance, a structure on the edge or on the bottom of the trough. The form of the structure can comprise nubs, grooves, lamellae or similar as well as combinations thereof. One or several components can project through one another, for example hard components can project through soft components.

The trough can be developed with a two-component or three-component lining for further improving the grip and ergonomics.

In addition, it is possible to provide transitions in the form of soft transitions from the handle, or else hard offset transitions from the handle, such as, for instance, with an offset indentation.

In principle, closed or open troughs can be provided, wherein in the closed version of the edge the trough is continuous and wherein in the open version the trough is open at least at one end (for example guides on the left and right in the direction of the longitudinal axis). It is also conceivable for the trough to be open at the front and rear.

Different developments are also conceivable with regard to embodiments with a hole in the handle. There can be one or several holes present, for example there can be one large hole and several small holes. The holes are preferably developed in a circular or oval manner, however, n-angle or polygonal holes (with rounded corners for example) are conceivable.

In addition, combinations of troughs and holes are also possible, as are also, for instance, holes inside a trough.

In addition, the support core preferably comprises a round, triangular or trapezoidal cross section.

As a rule, the cross sectional form of the support core depends on the specially chosen geometry of the bristle field. In addition, it is possible for the support core not to be surrounded at all or only surrounded in part by the casing or layer on one side (as a rule the bottom surface). The support core does not then comprise any bristles either on said side.

In another preferred embodiment of the present invention, the support core, and preferably also the bristle stem, tapers in the direction of its end remote from the neck element.

The tapering development of the support core as well as preferably also of the bristle stem ensure greater variability of the brush and contribute, where applicable, to the ease in which the brush is able to be moved into the interdental area.

In a preferred embodiment of the present invention, the handle comprises on its end remote from the neck element a notch which is preferably provided with a border from a soft component.

Using the notch, the brush is able to be mounted on a retaining device or else a glass or a beaker. The border with the soft component can increase the grip when putting it on as well as provide protection against scratching or damage.

The bristles preferably protrude in a non-radial manner from the longitudinal axis of the support core.

The individual bristles or rows of bristles protrude in fact substantially vertically from the longitudinal axis of the support core or else they lie horizontally within a plane which runs through the longitudinal axis or else runs below the longitudinal axis. The cleaning effect of the brush can be improved in the critical areas in the interdental spaces in this manner.

In a preferred manner, in addition, the bristles reduce in length in the direction of the end of the bristle stem remote from the neck element.

Said measure also serves for improving the cleaning effect in the interdental spaces as the form of the brush can be better adapted.

In another preferred embodiment of the present invention, two rows of bristles protrude substantially horizontally from the support core in a plane below the longitudinal axis of the support core.

In another preferred embodiment of the present invention, three rows of bristles, which converge in the direction of the end of the bristle stem remote from the neck element and which preferably protrude substantially vertically from the top surface, are arranged on the top surface of the support core.

As a result of said two measures, a perfectly complementing bristle field geometry can be created with which the interdental areas are able to be treated completely and uniformly. The non-radial arrangement of the rows of bristles in each case strengthens the cleaning effect compared to a radial arrangement of the same.

In a further preferred embodiment of the present invention, the second plastics material component is injected onto the front end of the handle, facing the neck element, wherein the second plastics material component overlaps a small part of the surface on the handle whilst it covers a substantial part of the surface on the rear side of the neck element and covers the surface of the support core completely, or else with the exception of a bottom side.

In a further preferred embodiment of the present invention, the second plastics material component is injected onto the front end of the support core, remote from the neck element, wherein the second plastics material component covers the surface of the support core completely, or else with the exception of a bottom side.

In a preferred embodiment of the present invention, two rows of bristles, which converge in the direction of the end of the bristle stem remote from the neck element and which protrude from the top surface preferably inclined outward, are arranged on the top side of the support core.

Here too, the two rows of bristles converge in the direction of the exposed end of the support core and the length of the individual bristles reduces in the direction of the exposed end of the support core. Said variant is somewhat simpler to produce than the variant with the three rows of bristles on the top surface of the support core. Once again, a somewhat modified cleaning effect is also produced. In principle, however, the number of rows of bristles can be chosen arbitrarily, a number between two and nine being preferred and a number between three and five being preferred even more.

The angle between the individual rows of bristles is a maximum of 180°, i.e. in each case the angle between the two rows of bristles which are the furthest apart. In another preferred embodiment, the angle is between 0° and 90°. In the case of the rows arranged in the center (on the top surface), the angle is, where applicable, between 0° and 20°; in the case of the rows arranged on the edge, the angle, in a preferred manner, is between 60° and 85°.

Further cleaning or polishing elements as well as further functional elements such as, for example, flossers (also known as dental floss tape or dental violins), toothpicks and tongue cleaners are suitable as possibilities for combination with the present product. Lamellae from the second material component can also be arranged on the support core.

The lamellae can be incorporated in the bristle field in different forms. For example, the lamellae can run around the support core in a helical manner, they can be arranged in disk-shaped manner around the support core and in this way several lamellae can also be arranged one behind another. In addition, it is possible to arrange longitudinal lamellae which extend along the longitudinal axis. Lamellae can be developed generally in a linear or also wave-shaped manner and the contour can be closed or open. In addition, the lamellae can realize an elevation profile.

The lamellae can be arranged in combination with the other named cleaning elements and, in particular, the lamellae can be arranged between the bristles.

With regard to the dimension of the brush according to the invention, a length of between 35 and 70 mm is preferred and a length of between 40 and 55 mm is preferred the most. In a preferred manner the height (including the bristle field) is between 0.8 and 2.8 mm and in the most preferred manner is between 1 and 2 mm. The width of the brush according to the invention is between 3 and 12 mm and in the most preferred manner between 5 and 8 mm.

In yet another further preferred embodiment of the present invention, the second plastics material component is injected onto the rear end of the handle, remote from the neck element, wherein the second plastics material component overlaps a large part of the surface on the handle, whilst it covers a substantial part of the surface on the rear side of the neck element and covers the surface of the support core completely, or else with the exception of a bottom side.

In addition, a brush is provided, in particular an interdental brush, comprising a handle, a neck element and a support core, wherein the neck element connects the handle and the support core and wherein a bristle field is applied onto the support core, and wherein the handle comprises a notch on its end remote from the neck part.

In a preferred manner, the notch is surrounded by two lateral flanks of the handle which are additionally developed in a flexible or resilient manner in the form of clamping arms. The flexibility of the two clamping arms can be formed as a result of the geometry of the same and/or as a result of the plastics materials or material combinations chosen.

The basic body, which at all events includes the handle and the neck element (these can however also be injected integrally with the support core), is regularly formed from a plastics material component, preferably a hard material.

The notch is preferably surrounded by a border produced from a soft component in order to ensure a better hold. The notch, however, can also be developed in a membrane-like manner with a soft component layer which is formed in a lip-like manner around the object inserted in each case.

Over and above this, the surface in the region of the notch can be provided such that said region includes a trough for holding the brush. In addition, surface elements, such as, for instance, lamellae and nubs among others, can be arranged in the region of the notch in order to improve the grip further.

Along with the named and described application on interdental brushes, the functional element of the notch can be used in general in manual oral hygiene appliances. For example, also on other interdental cleaning devices, toothbrushes, flossers, etc.

In a further development, a brush, in particular an interdental brush, which comprises a bristle-carrying stem, which defines a longitudinal direction and has an support core which extends in the longitudinal direction, and a bristle field with bristles which protrude from the bristle-carrying stem, is produced using the injection molding method.

A bristle field cavity, which serves for producing the bristle-carrying stem and the bristles, is closed for this purpose. This occurs as a result of moving the mold parts of the injection mold, which define the bristle field cavity, into the closed state. The bristle field cavity, thus closed, comprises a bristle field cavity opening.

A support core arranged with its longitudinal extension in the longitudinal direction is inserted into the closed bristle cavity in the longitudinal direction through the bristle field cavity opening. The inserted support core preferably projects out of the bristle field cavity beyond the bristle field cavity opening by way of a portion.

The support core inserted into the closed bristle field cavity is fixed in such a manner that it cannot be moved, i.e. displaced, in the longitudinal direction.

As a result of subsequently introducing plastics material into the bristle field cavity, a layer of plastics material is injected onto the support core and the bristles are simultaneously produced integrally with the layer.

The fixing of the support core prevents it from being able to be displaced in the longitudinal direction as a result of the force exerted on it by the liquid plastics material.

The advantage of inserting the support core into the already closed bristle field cavity is that damage to both the injection mold and the support core when closing the bristle field cavity is avoided. The inserting of the support core into the opened bristle field cavity, in the case of even small distortions of the support core, could result, when the bristle field cavity was closed, in its becoming jammed in the injection mold and said mold being damaged as a result.

In a preferred manner, an injection mold is provided with at least two bristle field mold parts which in the closed state define the—closed—bristle field cavity. The bristle field cavity comprises a bristle field cavity opening on an end face. Said opening is situated at an end of the bristle field cavity in the longitudinal direction.

Once the bristle field mold parts have been moved into the closed state, the support core is inserted in the longitudinal direction through the bristle field cavity opening into the bristle field cavity and is fixed by means of a fixing element. As a result of injecting plastics material into the bristle field cavity, the layer and at the same time the bristles are realized on the support core.

In a preferred manner, the layer is realized as a casing of the support core in such a manner that the support core cannot come into contact with the teeth when the interdental brush is applied. This offers the possibility of a metal wire, for example of spring steel, being able to be used as support core, the risk of a galvanic shock being prevented.

In a preferred manner, the plastics material is injected such that it flows into the bristle field cavity through the bristle field cavity opening.

The end of the support core, which is located in the bristle field cavity, is completely injected around by plastics material in a particularly preferred manner such that the casing forms a type of cap around the support core at the exposed end of the bristle stem.

In a preferred embodiment the support core is retained by means of the fixing element outside the bristle field to be formed—in the longitudinal direction—and the plastics material is injected in such a manner that it flows through the bristle field cavity opening into the bristle field cavity. The support core is consequently retained upstream in front of the bristles to be formed, which makes it possible for the support core to be able to extend over at least approximately the entire length of the bristle field cavity without there being any risk of it being bent by the plastics material flowing into the bristle field cavity.

The bristle field cavity can comprise a bristle field portion and, in the direction toward the bristle field cavity opening, connecting directly thereto, a neck portion for this purpose.

In a preferred manner, the support core is not fixed in a completely rigid manner, but the fixing is effected on a portion, in particular end portion of the support core, whilst the non-fixed part is able to be moved radially in the bristle field cavity. As a result, the fixing is secured purely in an axial manner.

That part of the interdental brush which comprises the injected bristles and which is intended for the purpose of being inserted into the interdental spaces when the interdental brush is applied, is produced in the bristle field portion.

The neck portion can consequently be realized greater than the diameter for the bristle-carrying stem in the bristle field portion.

In a preferred manner, the injection mold however comprises at least one neck mold part and the support core is retained during the injecting of the plastic material by means of the fixing element in the region of the neck mold part. The neck mold part is situated in this case on the side of the bristle field mold part on which the bristle field cavity opening is located.

In a further preferred embodiment, the injection mold comprises a cap mold part with a cap cavity which serves for realizing the layer, for example the casing at the exposed end of the bristle stem.

In a preferred manner the cap mold part abuts directly against the bristle field mold part.

In this case, the cap mold parts together with the bristle field mold parts and, where applicable, the neck mold parts and the fixing element are designated as the first mold part.

In a preferred manner, in the closed state two neck mold parts form a neck cavity, the neck cavity opening of which, when the plastics material is injected, is arranged abutting against the bristle field cavity opening. This enables the simultaneous and integral production of the layer or the casing and the bristles together with a neck cover or neck layer about the support core.

In a preferred manner, the fixing element is formed by two clamping punches which are located diametrically opposite one another with reference to the longitudinal direction and are movable toward one another from a rest position into a clamping position in order to hold the support core clampingly in the clamping position. In a preferred manner, the direction of movement of the clamping punches runs along a common straight line which extends at right angles to the longitudinal direction. The direction of movement, in this connection, is preferably parallel to the opening direction of the handle cavity and of the neck cavity.

In a preferred manner, the clamping punches engage into the interior of the neck cavity in their clamping position and are flowed around by plastics material during the injection molding. In a preferred manner, in this case, the clamping punches seal in relation to the support core such that the plastics material is not able to flow into the clamping region when said plastics material flows around the punch pairing.

This leads to the plastics material component of the interdental brush comprising recesses which are created by the clamping punches, or a passage created thereby through which the support core extends.

In a preferred manner, the support core is completely enclosed in the circumferential direction by the clamping punches which are moved into the clamping position such that a relevant fixing portion of the support core remains free of plastics material. In the passage of the plastics material formed as a result, the support core is free—without being encased by the plastics material. The support core preferably lies so deeply in the passage or recess that the risk of a galvanic shock when teeth are contacted is averted as the teeth are not able to contact it.

In order to achieve a particularly secure fixing of the support core, in a preferred manner the clamping punches comprise, in the end regions which face one another, teeth or tooth spaces which mesh with one another in the clamping position.

In a preferred manner, the support core is centered in the bristle field cavity—in the bristle field portion—at several support points which are spaced apart from one another in the longitudinal direction by means of bristle field mold parts. The bristle field mold parts comprise support elements which preferably protrude in the direction toward the interior of the bristle field cavity for this purpose.

In a preferred manner, the support elements protrude by between 0.08 mm and 0.16 mm, in a particularly preferred manner between 0.1 mm and 0.14 mm, in relation to the outside surface of the part of the bristle field cavity defining the bristle-carrying stem.

In addition, in a preferred manner the support elements are realized with reference to the support core in such a manner that, when measured in the radial direction, a gap of between 0.01 mm and 0.03 mm, in a particularly preferred manner of between 0.015 mm and 0.025 mm, remains between the support elements and the central or centrally imagined bristle-carrying stem. As a result, the support core can be inserted in the longitudinal direction into the bristle field cavity and between the support elements without any obstacle or deflection occurring. In addition, this makes it possible, during injection of the plastics material, to form a thin skin of plastics material on the support core at the support elements.

When viewed in the longitudinal direction, the support core is supported in an angularly offset manner by means of the support elements, in a preferred manner one following after another. The offset is preferably 90°. As a result, the support elements are spaced apart from one another in the longitudinal direction and no support elements are opposite one another in the radial direction. The plastics material can consequently flow practically unobstructedly from the bristle field cavity opening through the bristle field cavity as it is restricted in cross section at a maximum of one point. In this way, the support elements realize support points which are realized in a helical manner around the bristle-carrying stem.

In a preferred manner, the support points are arranged in such a manner that the distance between two support points on the same side is between 4 and 16 times and preferably 4 times a distance between bristles.

The last support point toward the exposed end of the support core is preferably situated directly after the last bristle plane or directly in front of the last bristle plane.

The support points are preferably arranged in a uniform manner. However, it is also possible for the distance between support points in the longitudinal direction not to be always the same.

The support points are preferably developed identically over the entire bristle field. Their number is defined by the length of the bristle-carrying stem and the distance between the support points.

The support points or support elements are arranged in such a manner that the bristle holes in the bristle field cavity are not able to be closed by the support core and the realizing of all the bristles is consequently ensured.

Bristle holes are to be understood as those parts of the bristle field cavity which proceed from the outside surface which determines the bristle-carrying stem and serve for forming the bristles.

In a preferred manner, the support core is formed by a metal wire, preferably from a stainless or rust-resistant spring steel. A 1.4310 steel is the most preferred. The yield strength of the metal wire should be greater than 2000 N/mm$^2$. This ensures good restoring torque when bending the bristle-carrying stem in the application and prevents the support core breaking when bent multiple times.

As an alternative to this, the support core can also consist of plastics material, ceramic or carbon-composite fibers.

Plastics material support cores can be produced by means of injection molding or extrusion. A reinforced plastics material is preferably used in order to obtain the necessary rigidity and hardness. Glass fibers or glass balls can preferably be used to reinforce the plastics material.

The injection molding or extrusion process for a plastics material support core is connected upstream of the injection molding process for the bristle field and can be separate or incorporated in the same injection mold (two or multiple component mold). The plastics material support core can be in a form that deviates from a wire and can define a substantial proportion of the handle part and at best the surface thereof.

In a preferred manner, a handle part of the interdental brush is also produced by means of the plastics material during the injection molding of the bristle field.

In this case, the handle part is injected in a handle mold part and this is also designated here as a second mold part.

For the abovementioned purpose, the injection mold preferably comprises two handle mold parts which, in the closed position, form a handle cavity with a handle cavity opening at an end face (second mold part). The bristle field mold parts, which are moved into the closed state, together with the support core, which is inserted into the first field cavity and is held by means of the fixing element, are moved to the handle-mold parts in such a manner that the end faces of the bristle field mold parts (or neck mold parts) and handle mold parts abut against one another and the bristle field cavity opening or further neck cavity opening is located at the handle cavity opening.

The bristle field cavity, where applicable with the cap cavity and the handle cavity, where applicable together with the neck cavity, consequently together form an injection cavity for the entire plastics material component of the interdental brush.

Said embodiment enables the plastics material to be injected into the handle cavity. It then flows through the handle cavity opening and bristle field cavity opening which are located close together with the neck cavity, or the neck cavity openings, interposed, into the bristle field cavity. An injection point in the region of the bristle field cavity can be avoided as a result.

It is also possible to inject the plastics material directly into the bristle field cavity by means of a corresponding injection point to produce the layer or casing and the bristles.

In this case, the bristle field cavity opening can serve as closure of the bristle field cavity such that a portion of the support core which protrudes beyond the bristle material is not injected around by the plastics material. This enables the production of interdental brushes which can be fastened on a separate handle in a known manner.

It is also possible in a corresponding manner for the further neck cavity opening to form the closure of the injection cavity and the support core to protrude through said opening such that the protruding portion is not injected around with plastics material.

The brush, in particular the interdental brush which is produced in compliance with the method according to the further development, whether it comprises a handle part or does not comprise a handle part, has a bristle-carrying stem, which defines the longitudinal direction and has an elongated support core which extends in the longitudinal direction, and bristles which protrude from the bristle stem. A layer is injected on the support core by means of plastics material or it is injected around by means of the plastics material, the plastics material realizing the layer or a casing of the support core and the bristles in an integral manner.

In a preferred manner, a fixing portion of the support core is at least partially exposed; the support core is not overlapped by the plastics material at the point that is exposed. In a preferred manner, said fixing portion is situated outside the region in which the bristles are situated.

In a preferred manner, the support core is partially exposed at the support points or at the support points is only coated by a plastics material film which is thin when compared to the remaining region of the plastics material of the casing. It must be mentioned that said support points are defined by the support elements which are explained further above.

If, in the case of an interdental brush, a support core produced from electrically conducting material, or a metal wire, is used, the exposed points are arranged in such a manner that the support core is not able to come into contact with the teeth.

In a preferred manner, the bristles protrude from the bristle-carrying stem in the radial direction.

In a further preferred manner, the bristles are arranged in bristle rows which extend in the longitudinal direction and are uniformly distributed in the circumferential direction. In addition, the bristles are preferably and additionally arranged in bristle planes which extend at right angles to the longitudinal direction and are spaced apart from one another in the longitudinal direction. Each bristle of a row of bristles is then also situated in a bristle plane.

In a preferred manner, the support points are situated in each case between successive bristle planes.

It must be mentioned at this point that the corresponding embodiment of the bristle field cavity is obviously also defined by means of the abovementioned arrangement of the bristles.

The injection mold comprises at least two bristle field mold parts which can be moved from an open state into a closed state. In the closed state, the bristle field mold parts define a bristle field cavity for producing the bristle-carrying stem and the bristles of the brush, in particular the interdental brush, as a result of injection molding the plastics material. In the closed state of the bristle field mold parts, the bristle field cavity, on an end face—and consequently on an end face of the bristle field mold parts, comprises a bristle field cavity opening. A support core can be inserted through said opening in each case in the longitudinal direction into the bristle field cavity. In addition, there is a fixing element which serves for fixing the support core inserted into the bristle field cavity.

Depending on the arrangement of the bristles, it can be necessary to provide more than two bristle field mold parts which form the bristle field cavity in the closed state. Forced removal from the mold can be avoided as a result.

In a preferred manner, the injection mold comprises two handle mold parts which can be moved from an open position into a closed position. In the closed position, the handle mold parts define a handle cavity with a handle cavity opening, said handle cavity serving for injection molding a handle part of the brush, in particular of the interdental brush. The bristle field mold parts, which are moved in the closed state, together with the support core, which has been inserted into the bristle field cavity and has preferably already been fixed by way of the fixing element, can be moved to the handle mold parts in such a manner that the bristle field cavity opening and the handle cavity opening are connected together and the bristle field cavity together with the handle cavity, where applicable with the neck cavity, realize an injection cavity.

In a preferred manner, a hot channel for supplying the liquefied plastics material into the injection cavity opens out into the handle cavity. The injection point formed as a result preferably lies in the handle of the interdental brush.

The bristle field mold parts can define more than one bristle cavity, each with a bristle field cavity opening. This is the case in particular when two interacting bristle field mold parts suffice.

A wire, in particular a steel wire, is preferably used a the support core. The diameter of the support core is between 0.1 mm and 0.4 mm and preferably between 0.15 mm and 0.25 mm. The length of the support core, dependent on the length of the bristle-carrying stem, is between 5 mm and 25 mm and is preferably between 13 mm and 20 mm.

The length of the support core is preferably chosen such that the support core ends where the cap-like extension of the bristle-carrying stem starts. However, it is also possible to develop the length of the support core such that a uniform surface layer is formed over the entire support core.

The support core is preferably realized as a straight cylinder. In this case, the cross section is preferably round, however, it is also possible to shape the cross section as a regular n-angle form or to give it a T-shaped or double T-shaped profile or to define another closed contour as a cross section. The important point is that the support core is able to be introduced into the closed bristle field cavity without any problems.

In principle, the support core can also be realized in a form that is not straight but curved so long as it is able to be inserted into the closed bristle field cavity. For example, a banana shape would be possible. As, however, the insertion of the support core is more difficult, it is simpler to introduce possible curvatures of the bristle-carrying stem after the injection molding.

In the region of the fixing of the support core, it is also possible to give the support core a structure which improves the fixing. For example, a snake shape or a helix, short forms which improve the clamping of the support core interacting with the fixing element which is adapted if needs be.

The casing is realized in such a manner that it overlaps the exposed end of the support core in a cap-like manner. The steel wire which is used in a preferred manner is thus not on the surface.

In a preferred manner, the support core and consequently the wire protrudes by between 3 mm and 12 mm, preferably by between 4 mm and 6 mm, beyond the bristle-carrying stem in the direction of the handle, in a preferred manner right into the neck portion.

On the side of the fixing element remote from the bristle-carrying stem (after the fixing element), the length of the support core or steel wire is between 0.5 mm and 3 mm and preferably between 1 mm and 2 mm.

Plastics material, for example PA or POM, or materials such as Keflar can be used for the support core along with the already named metal. In general, materials which ensure good restoring torque and do not break when bent multiple times are suitable.

The support core can comprise a special surface structure or surface treatment.

A smooth surface promotes sliding and can exert a negative influence as, depending on the material combination, the support core can break out of the casing because a relative movement is possible between the two elements. If the surface is roughened, for example, the adhesion between the plastics material and the support core material can be improved. The rough structure can be improved in general by etching, insertion of striations or structure.

In order to achieve a roughness, it is also possible to coat the surface of the support core in a corresponding manner. Varnish, adhesion promoting agent or primer are suitable for this purpose. The important point in this connection is that the surface coating is not pushed away by the injection pressure or damaged in the process on account of the heat.

The thickness of the casing (measured in the radial direction outside the region of the bristles and with reference to the longitudinal direction) is between 0.05 mm and 0.3 mm and is preferably between 0.1 mm and 0.2 mm.

In a preferred manner, the diameter of the bristle-carrying stem, i.e. the diameter without bristles, is between 0.2 mm and 1.5 mm and in a preferred manner is between 0.35 mm and 0.9 mm.

In a preferred manner, the bristle-carrying stem comprises a length of between 6 mm and 16 mm and in a particularly preferred manner of between 9 mm and 13 mm.

In a particularly preferred manner, the bristle-carrying stem comprises a conical outside surface. At the exposed end of the support core, the diameter is preferably between 0.35 mm and 0.65 mm, at the handle end of the bristle-carrying stem it is preferably between 0.65 mm and 0.85 mm.

The bristles, measured from the casing to the exposed end, in a preferred manner comprise a length of between 0.2 mm and 5 mm and in a particularly preferred manner of between 0.5 mm and 3 mm.

The ratio between the bristle diameter and the diameter of the support core is between 1:8 and 3:1 and is preferably between 1:2 and 3:4.

The ratio between the bristle diameter and the diameter of the bristle-carrying stem is between 1:30 and 3:2 and is preferably between 1:6 and 1:3.

The shell created by the bristle field (on the ends of the bristles) can assume the most varied forms. For example, the bristles can form a straight circular cylinder or a cylinder with a triangular cross section (form of a Xmas tree). In addition, other forms where the cross section changes over the length or said cross section is not regular at a point are also possible. Thus, wave-shaped or comical forms can be provided. Molds as can be achieved in the case of screwed-in brushes, can also be realized in this way, and there are more possibilities provided from the viewpoint of complexity as the boundaries are set just by the injection mold.

The diameter of the bristles, in a preferred manner, is between 0.05 mm and 0.3 mm and in a particularly preferred manner between 0.1 mm and 0.2 mm—measured at the bristle stem which is realized so as to be rounded off in a preferred manner at the exposed end.

In a preferred manner, the bristles are arranged in between 2 and 10, in a particularly preferred manner between 4 and 8, in particular 6 rows of bristles which extend in the longitudinal direction and are evenly distributed in the circumferential direction.

In addition, in a preferred manner the bristles are arranged in planes, so-called bristle planes, which extend at right angles to the longitudinal direction and are arranged spaced apart at a preferably constant distance in the longitudinal direction. It is also possible to arrange the bristle planes in a non-regular manner, i.e. to vary the distances they are spaced apart.

An angle of preferably 45°, 60° or 90°, which is regular over the entire cross section of the bristle field on account of the preferably regular arrangement of the rows of bristles, is realized between the longitudinal central planes which are defined by the bristles. An irregular arrangement, i.e. different angles between the rows of bristles, is possible.

The distance between adjacent bristles, measured in the longitudinal direction and along the connecting line from bristle center to bristle center between the bristles, is preferably between 0.2 mm and 0.8 mm, in particular between 0.4 mm and 0.6 mm.

In a preferred manner, between 10 and 40, in particular between 18 and 30 bristles are provided in one bristle row. Between 200 and 400 bristles and preferably between 100 and 150 bristles are arranged in the entire bristle field in this way.

The outside diameter of the bristle field is preferably between 1 mm and 6 mm, and in a particularly preferred manner between 1.5 mm and 4 mm.

The dimensions for the bristle field, which is formed by the bristle field mold parts, are also obviously produced from the specified dimensions for the casing and the bristles.

The parting plane of the bristle field mold parts extends in a preferred manner through the bristles of at least one row of bristles. If four rows of bristles are provided, the parting plane, in a preferred manner, extends through the bristles of two rows of bristles which are located diametrically opposite one another. In a particularly preferred manner, each row of bristles has associated therewith a parting plane, in particular in the event of there being provided more than two bristle field mold parts. This implies simpler production, provides the injection mold with sufficient ventilation possibilities for the bristles and finally the bristle lengths and diameters are not restricted by the production method of the injection mold.

In a preferred manner, the clamping punches are realized in a circular-cylindrical manner and comprise a diameter of between 0.75 mm and 3 mm, in a particularly preferred manner of between 1.2 mm and 1.8 mm. Said diameter also corresponds to the diameter of the recess formed by the clamping punches or of the passage in the neck region.

Further alternative cross sections are, for example, oval or n-angle forms. The round forms have the advantage for reasons of the fluid handling of the plastics material.

In a preferred manner, the clamping punches, on their end regions that face one another, comprise teeth or clamping prongs with a height of between 0.4 mm and 2 mm and in a preferred manner between 0.6 mm and 0.9 mm (said height is measured from the longitudinal axis).

With reference to the longitudinal direction, in a preferred manner one tooth is provided on the one side and two teeth are provided on the other side. The other clamping punch is realized in the opposite direction such that the teeth engage in a meshing manner with one another in the clamping position. There can also be more than three teeth present per clamping punch.

It is also conceivable for the one clamping punch to comprise two oppositely situated teeth which engage in corresponding tooth spaces between each of the two teeth of the other clamping punch.

The length of the fixing of the support core by the clamping punch or another fixing element is between 0.7 mm and 2.5 mm and preferably between 1 mm and 2 mm.

In this case, said length is preferably distributed uniformly among the different elements, e.g. teeth, i.e. they have the same widths. As an alternative to this, it is also possible to vary the widths.

In a preferred manner, the position of the fixing elements is chosen such that the distance from the fixing element to the beginning of the bristle-carrying stem is between 1 mm and 6 mm and is preferably between 3 mm and 5 mm.

It is also conceivable to apply a two-component or multiple-component injection molding method. In this case, it is possible, for example, to produce the layer or the casing and the bristles from one plastics material and the handle part from another plastics material. In addition, it is also possible to produce the casing and the bristles as well as part of the handle from one plastics material and to manufacture the remaining part of the handle part as a result of injecting on a second plastics material. The second plastics material can also cover exposed parts of the support core.

Different plastics materials can be used for realizing the brush, in particular the interdental brush. The materials specified below can be used for a possible plastics material support core, the bristle field and the casing or the handle part. Plastics materials which enter into a material bond together by means of multiple-component injection molding are used in a preferred manner.

A plastics material support core is produced from a harder plastics material than the plastics material for the bristle field and the layer or casing or the handle part.

The following hard components are possibilities of examples from the area of thermoplastics:
- styrene polymerisats such as styrene acrylonitrile (SAN), polystyrene (PS), acrylonitrile-butadiene-styrene (ABS), styrene methyl methacrylate (SMMA) or styrene butadiene (SB);
- polyolefins such as polypropylene (PP) or polyethylene (PE) for example also in the forms of high density polyethylene (HDPE) or low density polyethylene (LDPE);
- polyesters such as polyethylene terephthalate (PET) in the form of acid-modified polyethylene terephthalate (PETA) or glycol-modified polyethylene terephthalate (PETG), polybutylene terephthalate (PBT), acid-modified polycyclohexylene dimethylene terephthalate (PCT-A) or glycol-modified polycyclohexylene dimethylene terephthalate (PCT-G);
- cellulose derivatives such as cellulose acetate (CA), cellulose acetate butyrate (CAB), cellulose propionate (CP), cellulose acetate phthalate (CAP) or cellulose butyrate (CB);
- polyamide (PA) such as PA 6.6, PA 6.10 or PA 6.12;
- polymethyl methacrylate (PMMA);
- polycarbonate (PC);
- polyoxymethylene (POM);
- polyvinyl chloride (PVC);
- polyurethane (PUR).

The following soft components are examples from the range of thermoplastic elastomers (TPE's):
- thermoplastic polyurethane elastomers (TPE-U)
- thermoplastic styrene elastomers (TPE-S) such as, for example, a styrene ethylene butylene styrene copolymer (SEBS) or styrene butadiene styrene copolymer (SBS)
- thermoplastic polyamide elastomers (TPE-A)
- thermoplastic polyolefin elastomers (TPE-O)
- thermoplastic polyester elastomers (TPE-E).

In addition, the thermoplasts polyethylene (PE) and polyurethane (PU) as named can be used both as hard components and as soft components.

An ethylene vinyl acetate (EVA) can be used in particular as a polyolefin.

PP is particularly suited as a hard component, most preferred is PP with a modulus of elasticity of between 1000 and 2400 N/mm$^2$, preferably between 1300 and 1800 N/mm$^2$. In a preferred manner a TPE-S is used as a soft component. The Shore A hardnesses of the soft components are preferably below 90 Shore A. The soft components form a material bond with the hard component by means of over injection using the two-component or multiple-component injection molding method.

Example materials for the production of injected bristles:
- polyamide elastomers (e.g. Grilflex ELG 5930 of Ems-Chemie AG)

polyester elastomers (e.g. Riteflex 672 RF Nat or Riteflex RKX 193 RF Nat of Ticona Polymers or Hytrel 7248 of Dupont)

thermoplastic polyurethane elastomers (e.g. Desmopan DP 1092A, DP 3065D, DP 1092A of Bayer Material Science or Elastolan 1154 D, 1195 A of BASF).

The bristle materials have a Shore D hardness of between 0 and 100, preferably of between 30 and 80 and in a particularly preferred manner of between 50 and 70.

So-called bioplastics materials, plastics materials which are produced from renewable raw materials, can also be used.

It is also possible, in particular, to produce mascara brushes using the method and an injection mold of this type. In the case of said mascara brushes, the length of the bristle field is between 8 mm and 30 mm, preferably between 8 mm and 15 mm or between 22 mm and 28 mm. The bristles comprise a length of between 1.5 mm and 3 mm. All remaining dimensions can correspond to those of the interdental brush.

It is equally conceivable to produce treatment heads of electrically operated interdental cleaners (toothbrushes) or of ear cleaners, pipe cleaners, bottle brushes and applicator brushes (medical area) in this way.

The support cores are preferably inserted into the bristle field cavity by means of a feed and supply device. Said device can comprise, for example, a hopper with support cores which are separated into singles and then pushed forward into the bristle field cavity, or a cutting device which detaches from a long store portions which form support cores and which are supplied to the bristle field cavity.

As an alternative, the support cores are produced in an upstream or integrated inject mold. A multiple-component injection mold can be used.

The invention is explained in more detail by way of an exemplary embodiment shown in the drawing, in which, in a purely schematic manner:

Figures 19A, 19B:
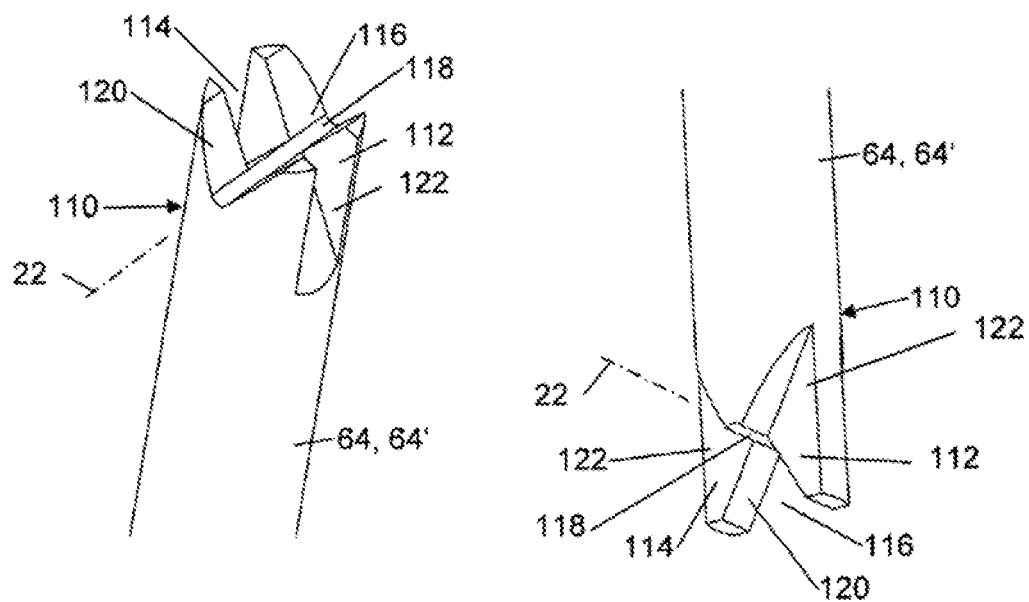

FIG. 19*a* shows a perspective representation of a first clamping punch for securing the support core in the injection mold;

FIG. 19*b* shows a second clamping punch, the free end region of which is formed in a mirror-inverted manner to the first clamping punch shown in FIG. 19*a;*

Figure 20:
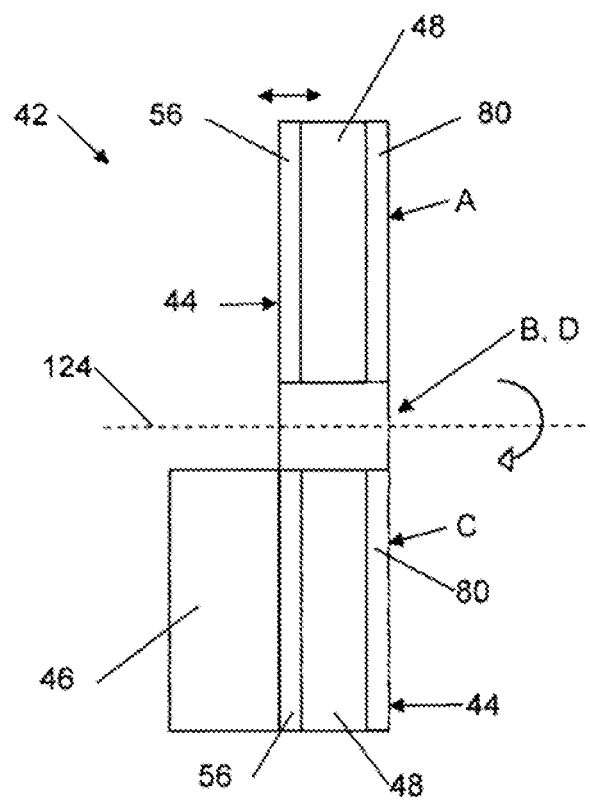
Figure 21:
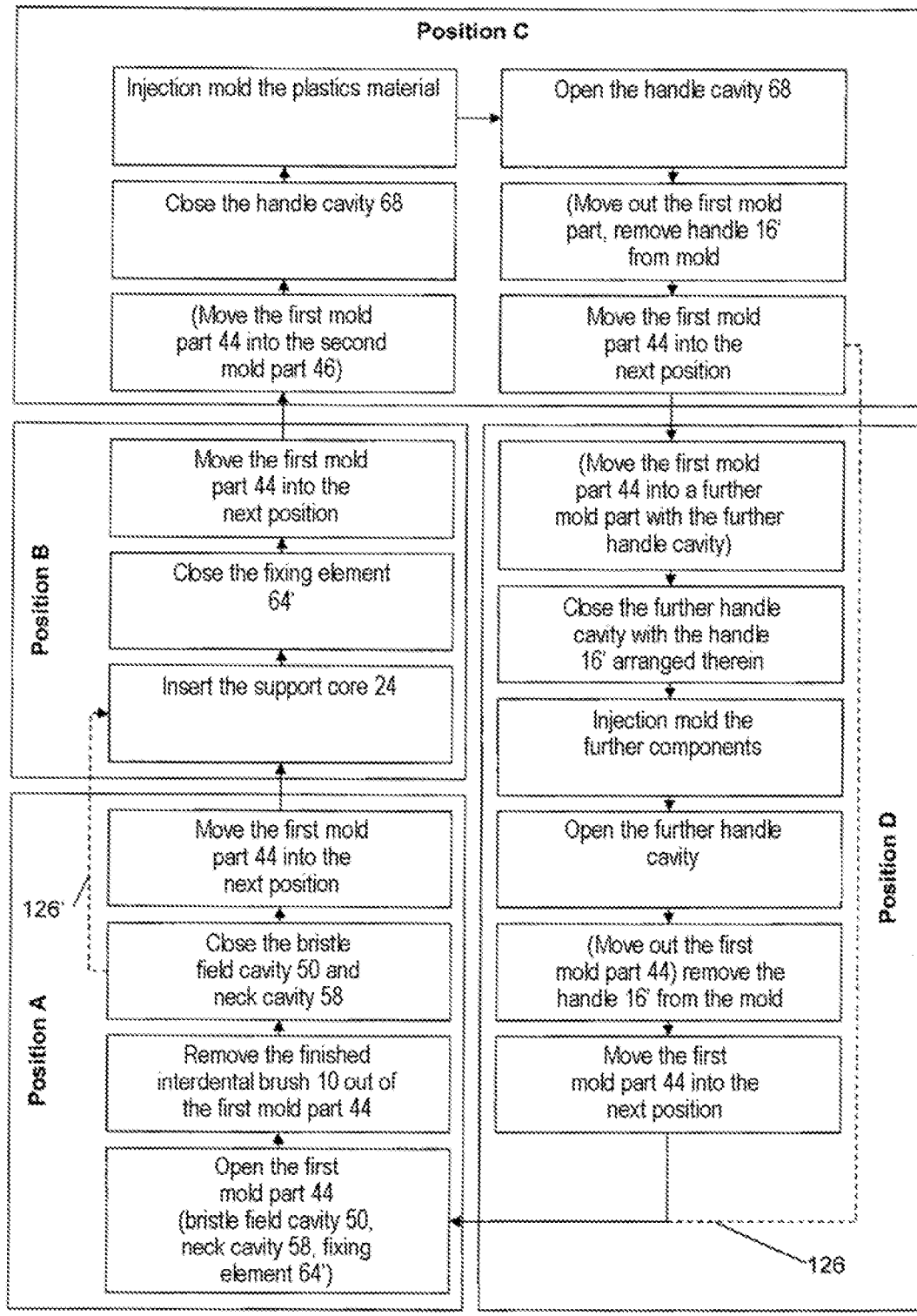
Figure 22:
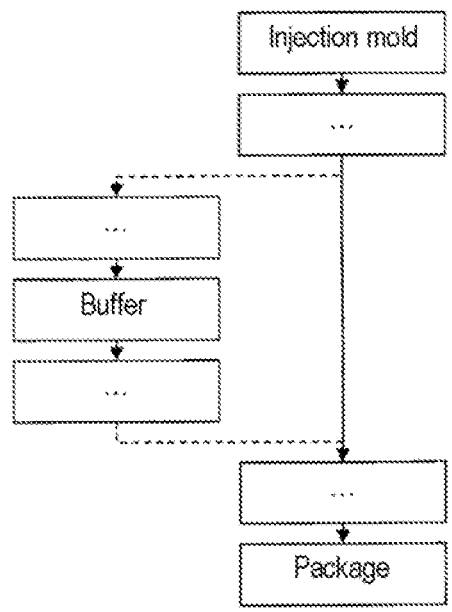
Figure 23:
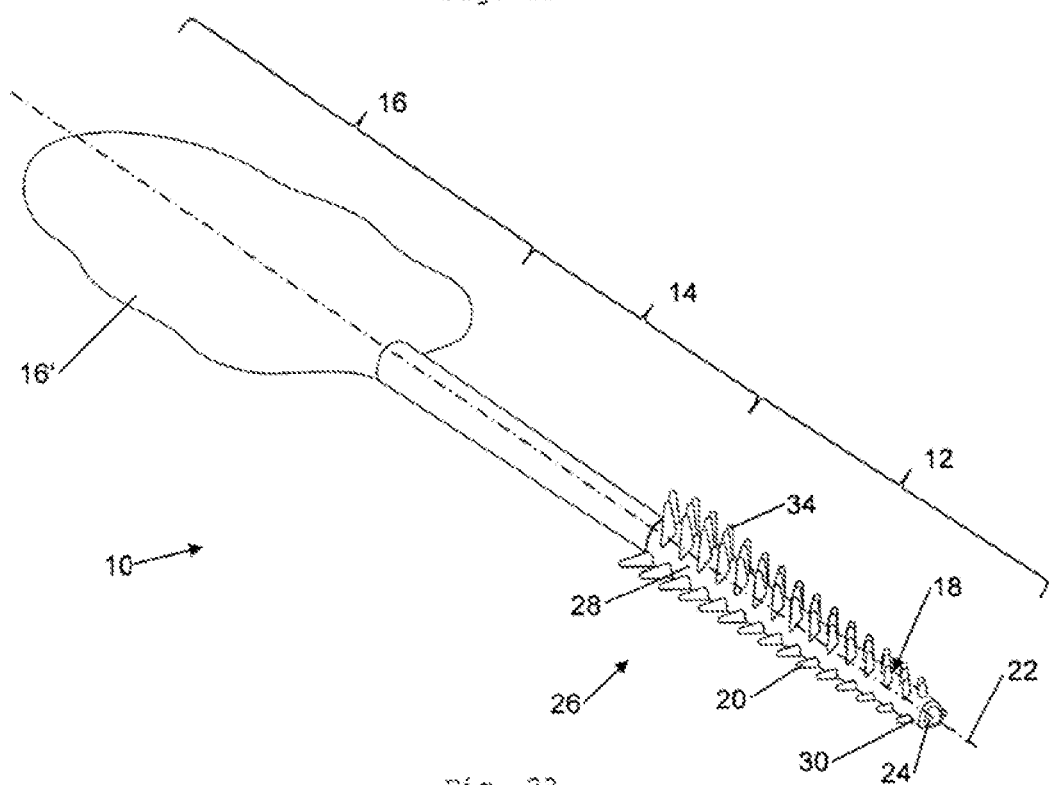
Figure 24:
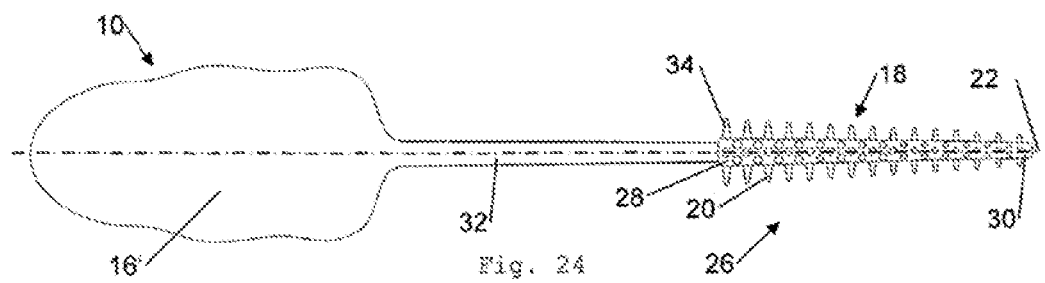
Figure 25:
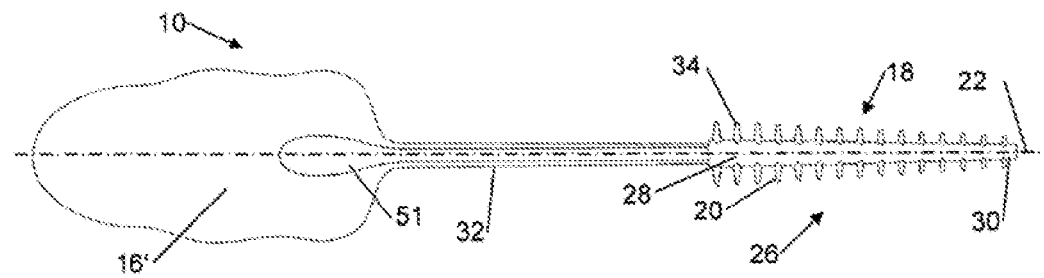
Figure 26:
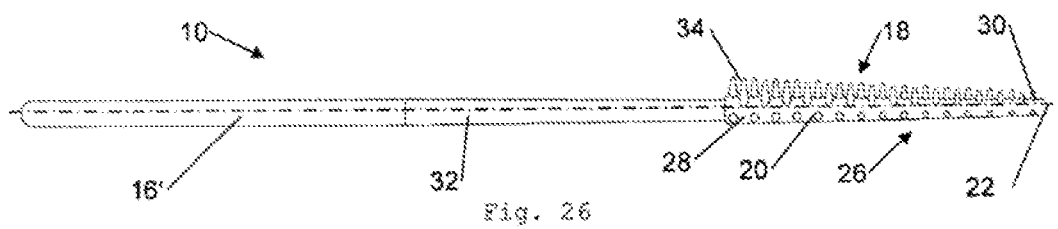
Figure 27:
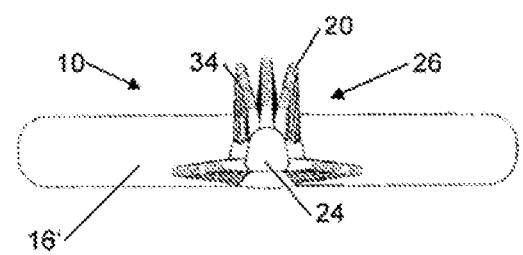
Figure 28:
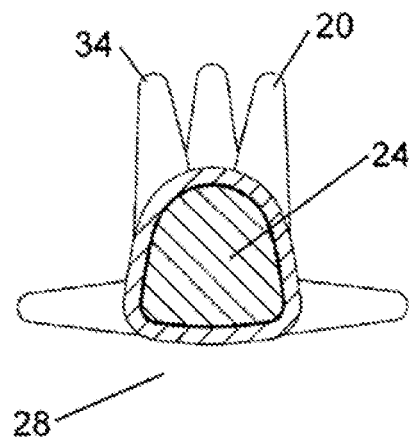
Figure 29:
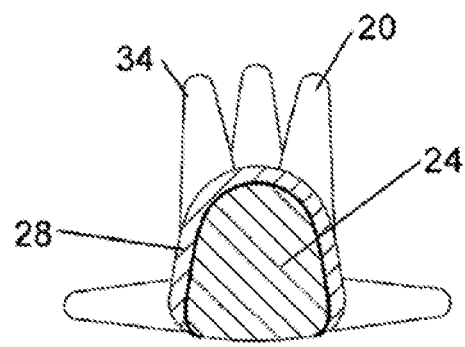
Figure 30:
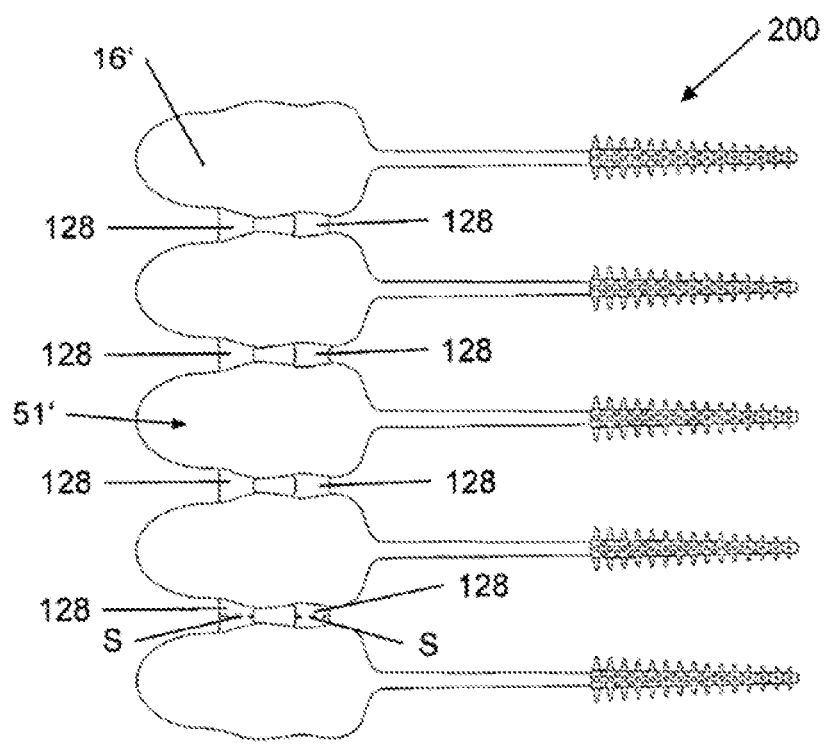
Figure 31:
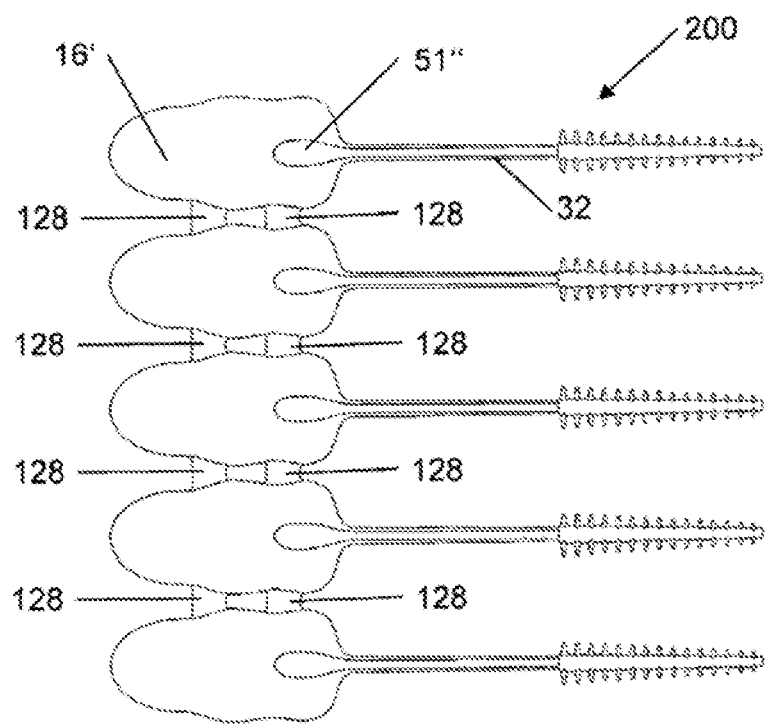
Figure 32:
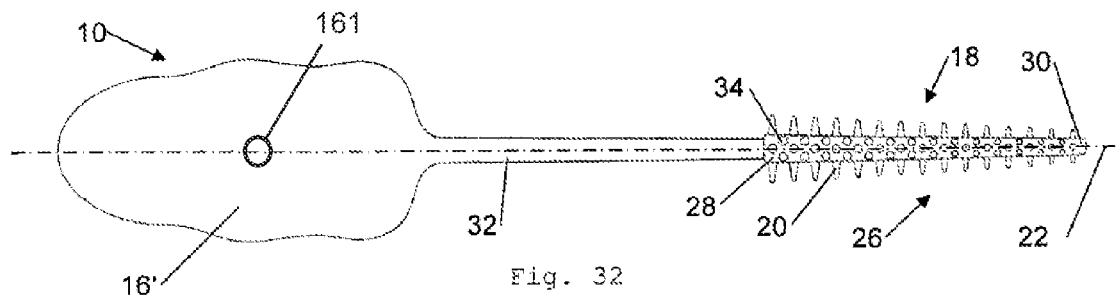
Figure 33:
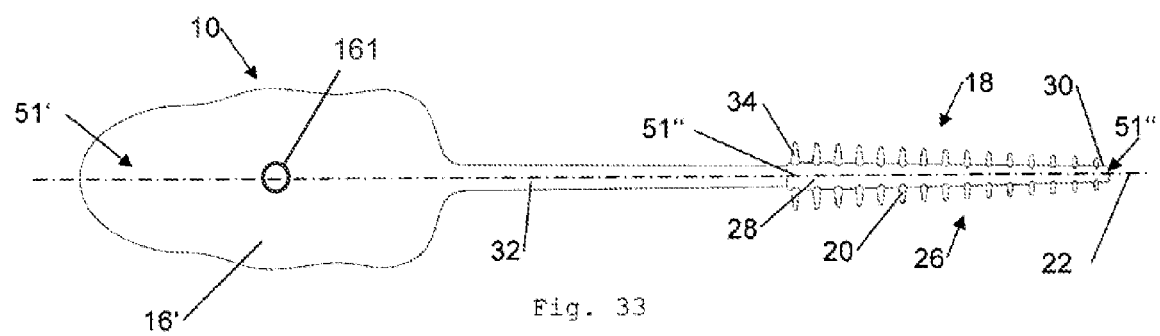
Figure 34:
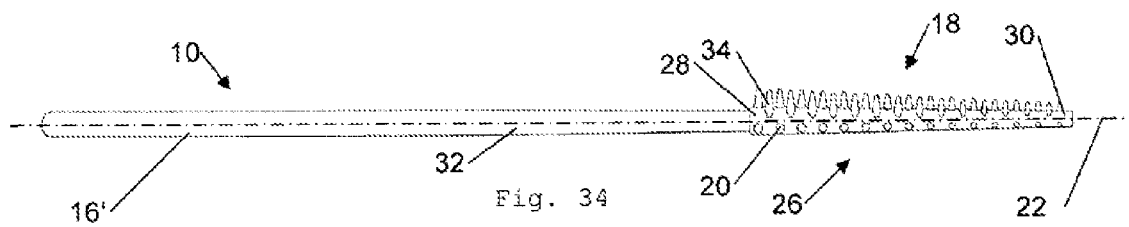
Figure 35:
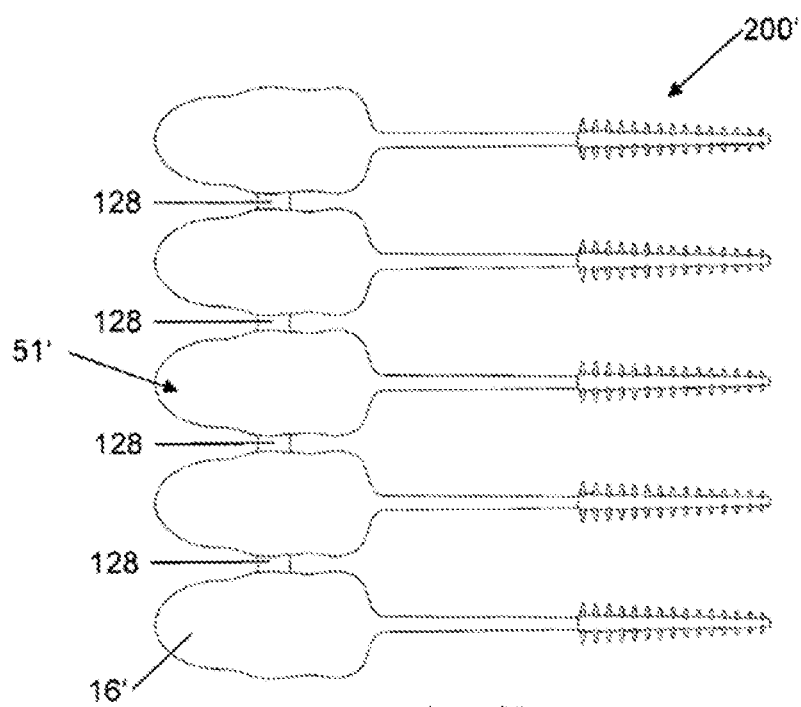
Figure 36:
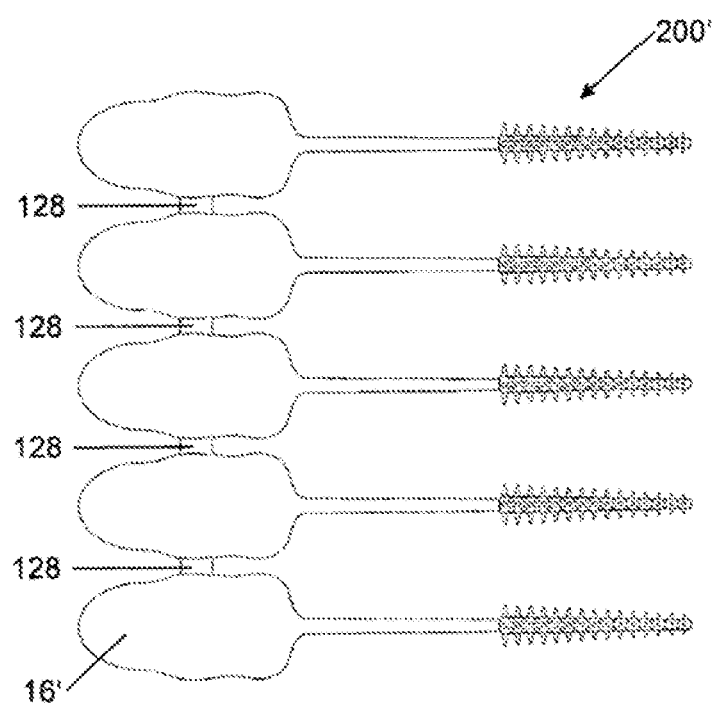
Figure 37:
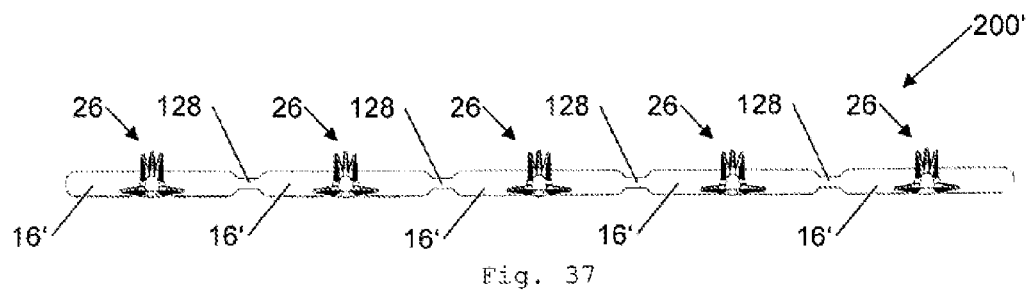
Figure 38:
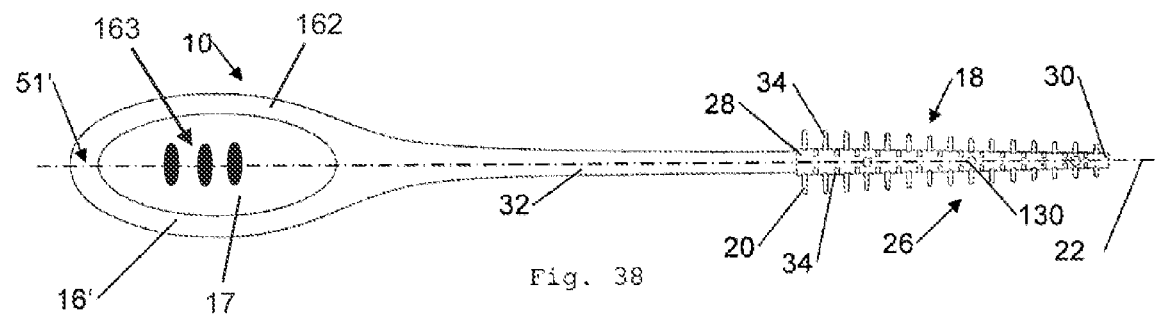
Figure 39:
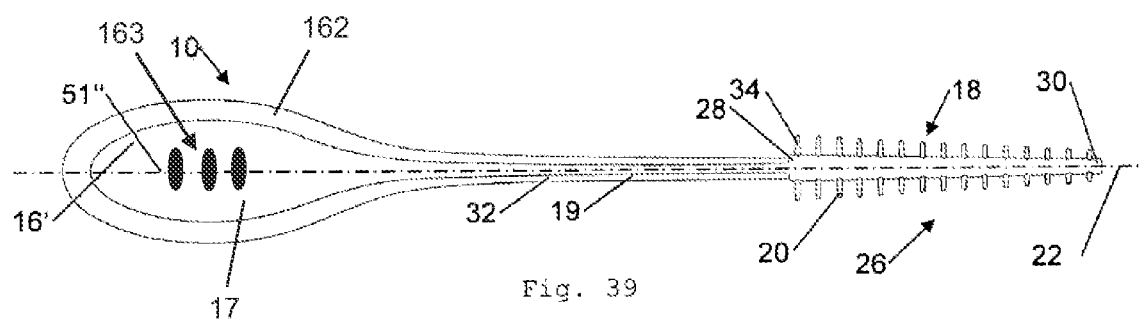
Figure 40:
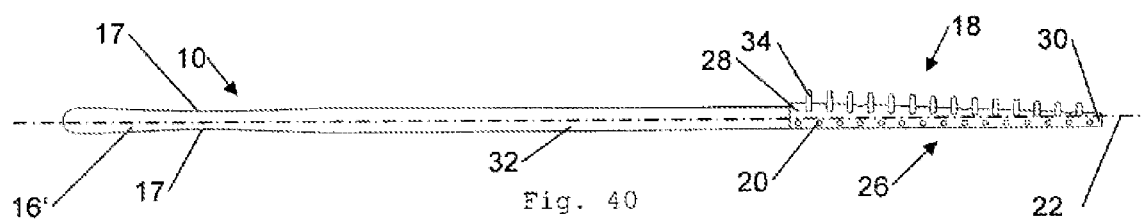
Figure 41:
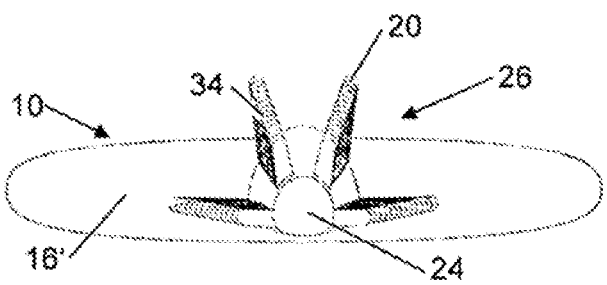
Figure 42:
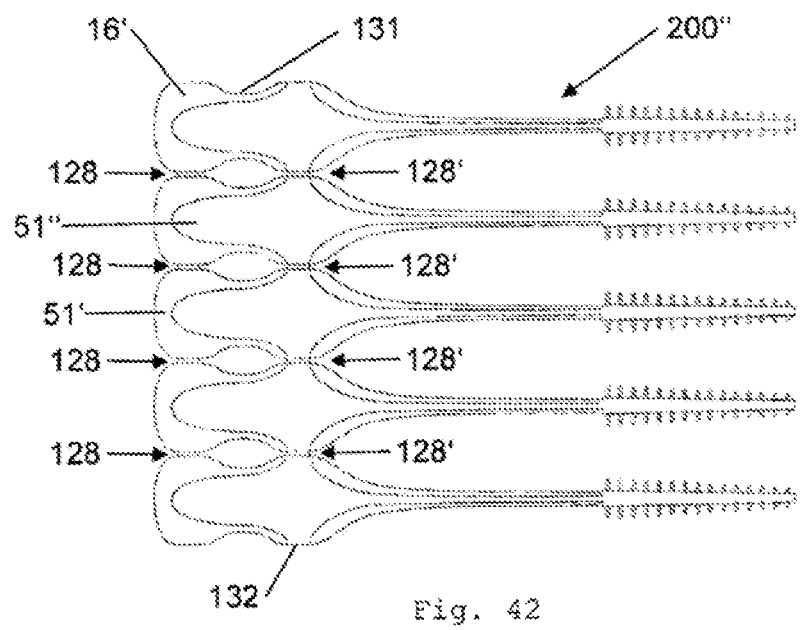
Figure 43:
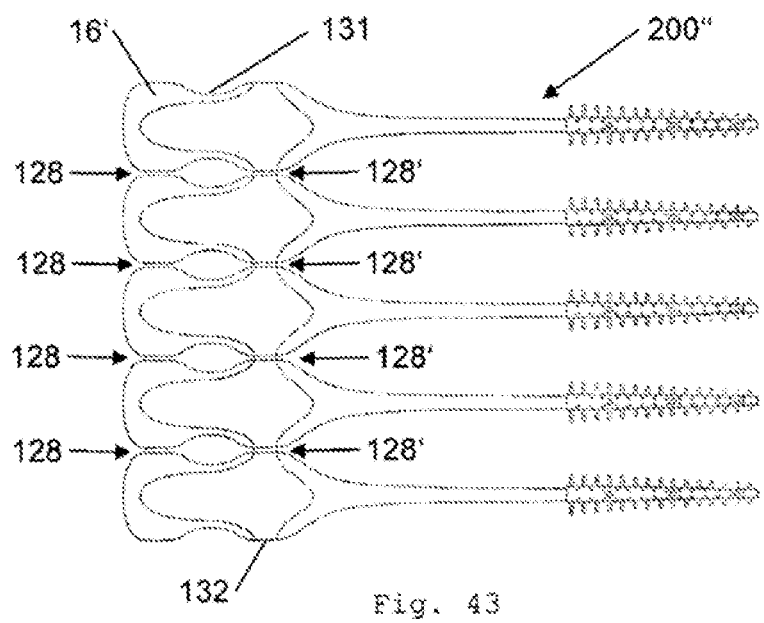
Figure 44:
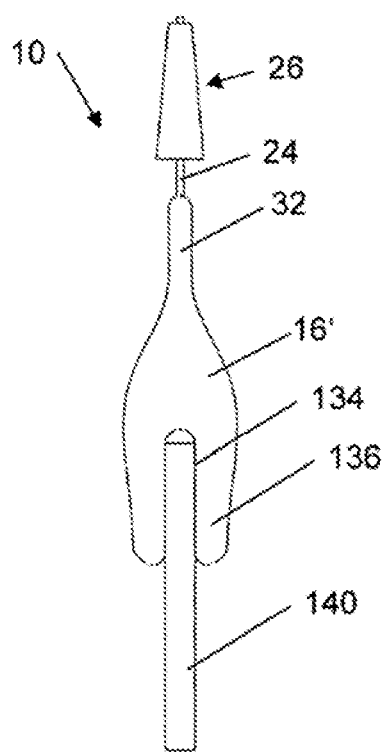
Figure 45:
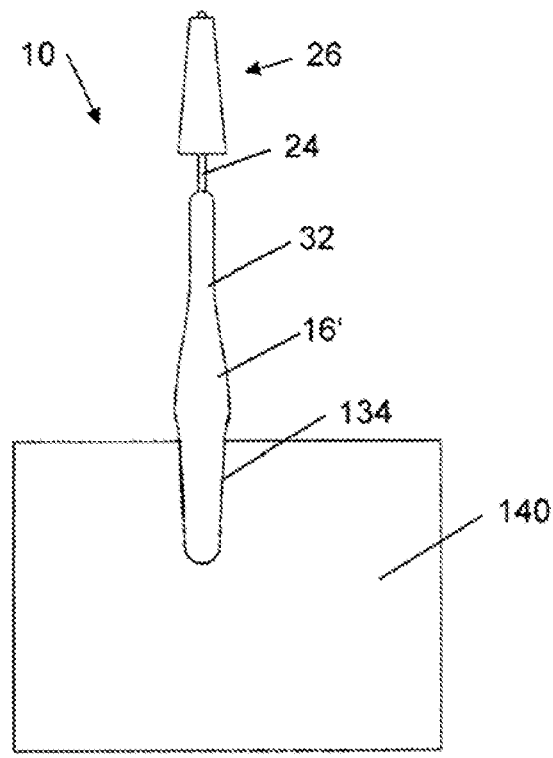
Figure 46:
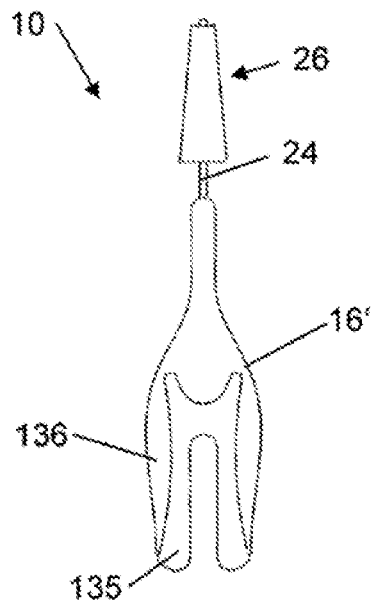

FIG. 20 shows a sectional and schematic view of the injection mold;

FIG. 21 shows a flow diagram for producing the interdental brush according to the invention;

FIG. 22 shows a simplified sequence for possible further processing of the interdental brush produced using injection molding;

FIG. 23 shows a perspective representation of an embodiment of an interdental brush according to the invention;

FIG. 24 shows a view from the front of the interdental brush of FIG. 23;

FIG. 25 shows a view from the rear of the interdental brush of FIG. 23;

FIG. 26 shows a side view of the interdental brush of FIG. 23;

FIG. 27 shows a frontal view of the interdental brush of FIG. 23;

FIG. 28 shows a cross section of the interdental brush from FIG. 23 between bristle planes;

FIG. 29 shows a cross section of the interdental brush from FIG. 23 between bristle planes in a further development variant of the combination of support core/casing or layer;

FIG. 30 shows a view from the front of a product group of interdental brushes according to FIGS. 23-29;

FIG. 31 shows a view from the rear of the product group of interdental brushes according to FIGS. 23-29;

FIG. 32 shows a view from the front of a further embodiment of an interdental brush according to the invention;

FIG. 33 shows a view from the rear of the interdental brush according to FIG. 32;

FIG. 34 shows a side view of the interdental brush according to FIG. 32;

FIG. 35 shows a view from the rear of a product group of interdental brushes according to FIG. 32;

FIG. 36 shows a view from the front of a product group of interdental brushes according to FIG. 32;

FIG. 37 shows a frontal view of the connecting group of interdental brushes according to FIG. 32;

FIG. 38 shows a view from the front of a further embodiment an interdental brush according to the invention;

FIG. 39 shows a view from the rear of the interdental brush according to FIG. 38;

FIG. 40 shows a side view from of the interdental brush according to FIG. 38;

FIG. 41 shows a frontal view of the interdental brush according to FIG. 38;

FIG. 42 shows a view from the rear of a product group of interdental brushes similar to FIGS. 38-40;

FIG. 43 shows a view from the front of the product group of interdental brushes similar to FIGS. 38-40;

FIG. 44 shows a view from the front of a further embodiment of an interdental brush with the wire having been injection coated;

FIG. 45 shows a side view of the interdental brush according to FIG. 44;

FIG. 46 shows a view from the front of a preferred embodiment of an interdental brush with the wire having been injection coated.

The interdental brush 10 shown in FIGS. 1 to 11 comprises a bristle field portion 12, a neck portion 14 and a handle portion 16 with a handle 16'. A bristle-carrying stem 18, from which bristles 20 protrude, extends, in the present case in a straight line, over the entire length of the bristle field portion 12 and establishes a longitudinal direction 22; the dot-dash line showing the longitudinal direction 22 also defines the longitudinal axis.

Figure 1:
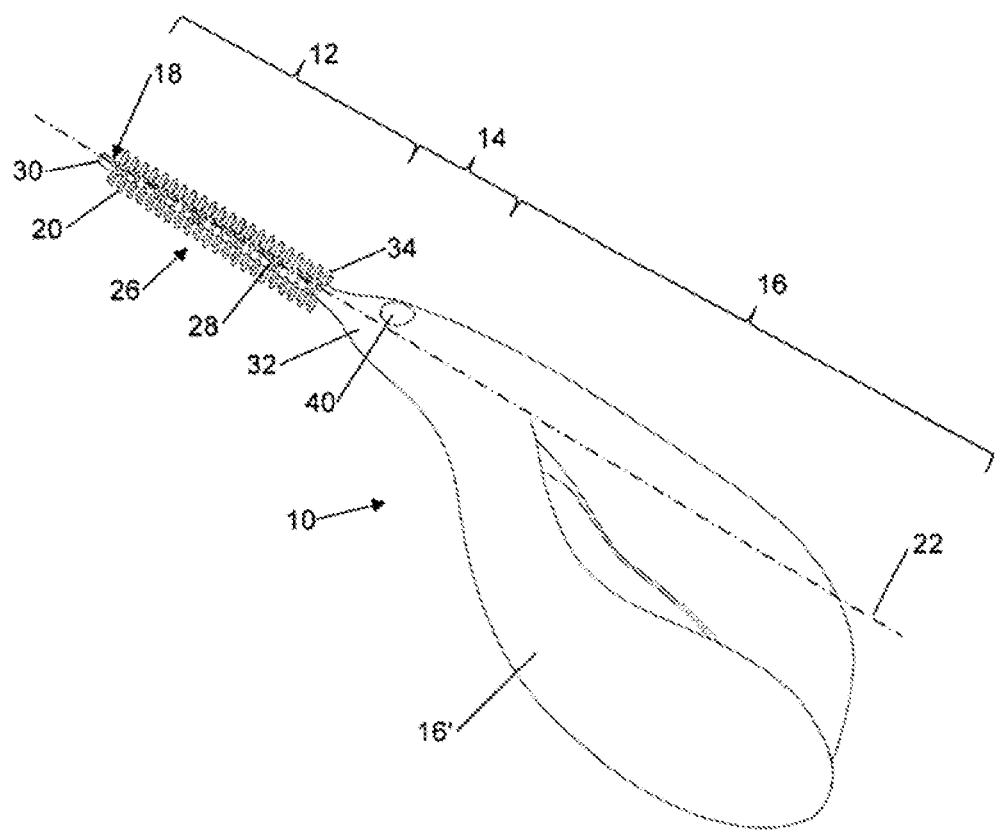
FIG. 1 shows a perspective representation of an interdental brush.
Figure 2:
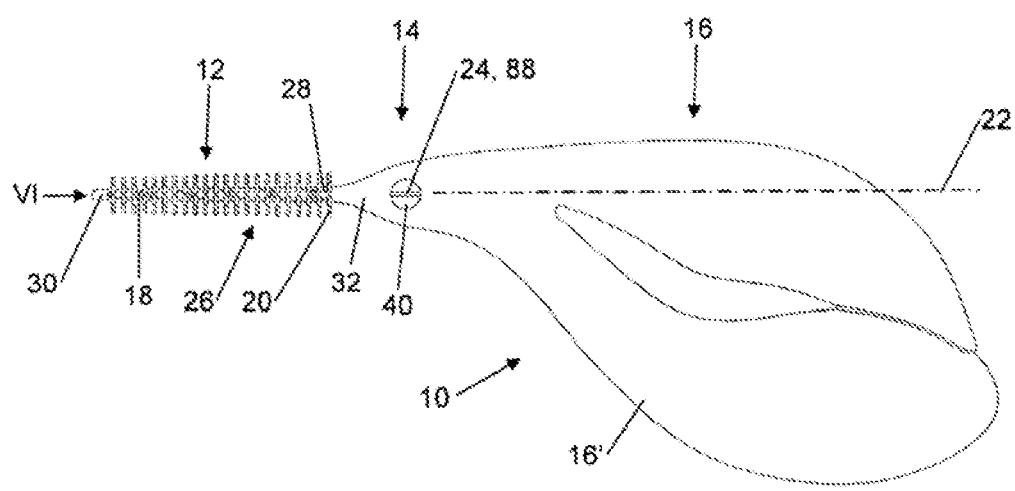
FIG. 2 shows a view from the front of the interdental brush of FIG. 1.
Figure 3:
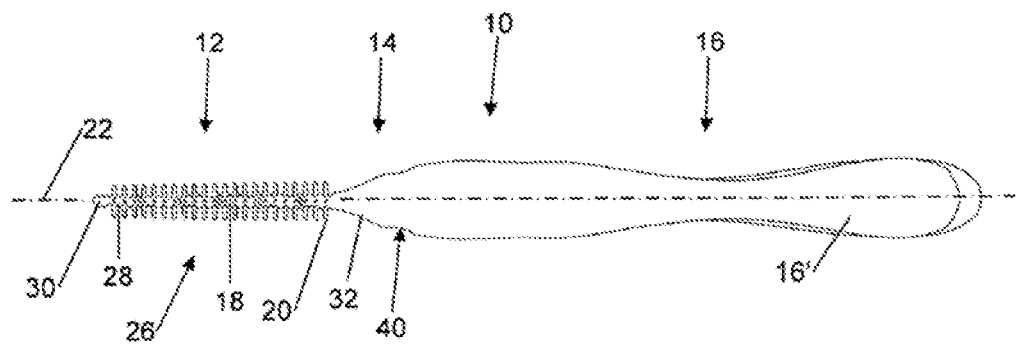
FIG. 3 shows a top view of the interdental brush of FIG. 1.
Figure 4:
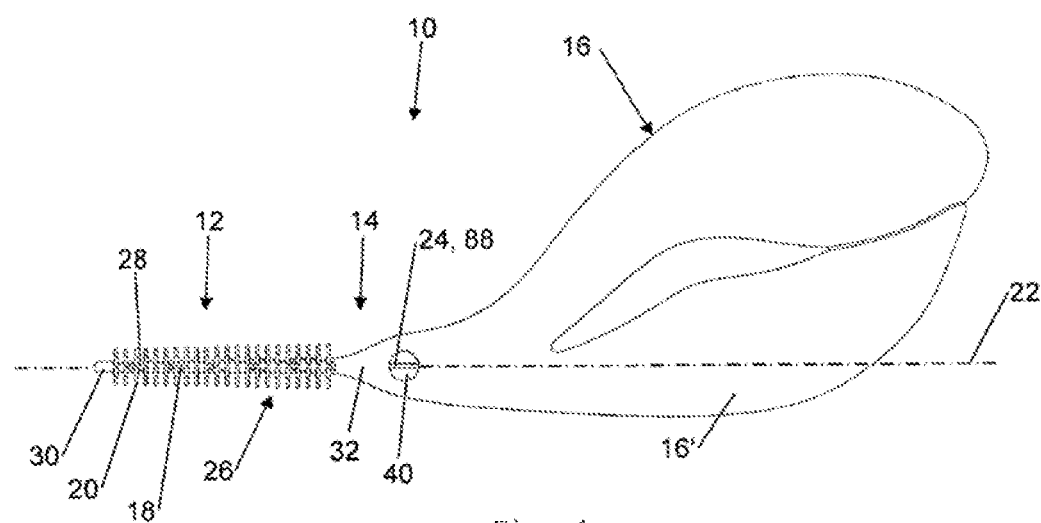
FIG. 4 shows a view from the rear of the interdental brush of FIG. 1.
Figure 5:
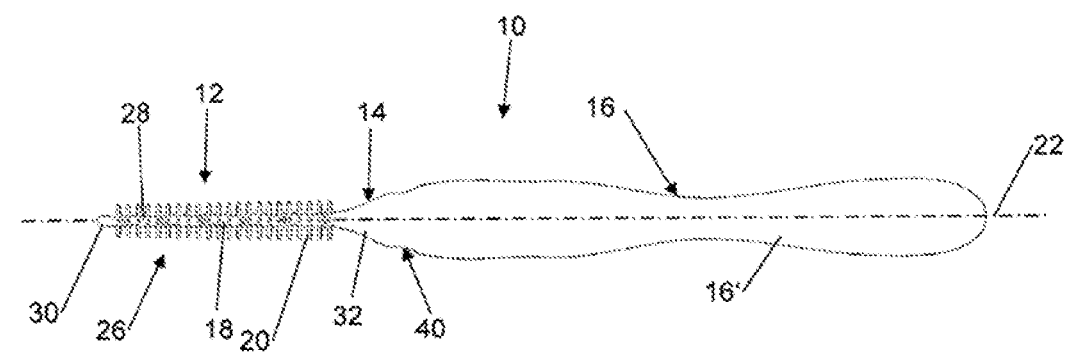
FIG. 5 shows a bottom view of the interdental brush from FIG. 1.
Figure 6:
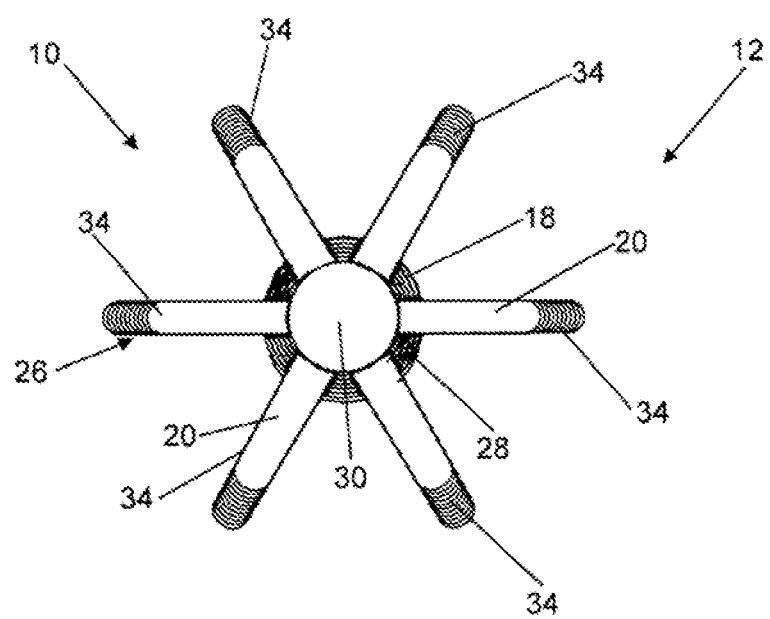
FIG. 6 shows a side view in the direction of the arrow VI of FIG. 2 of the bristle trimming of the interdental brush shown in FIGS. 1 to 5.
Figure 7:
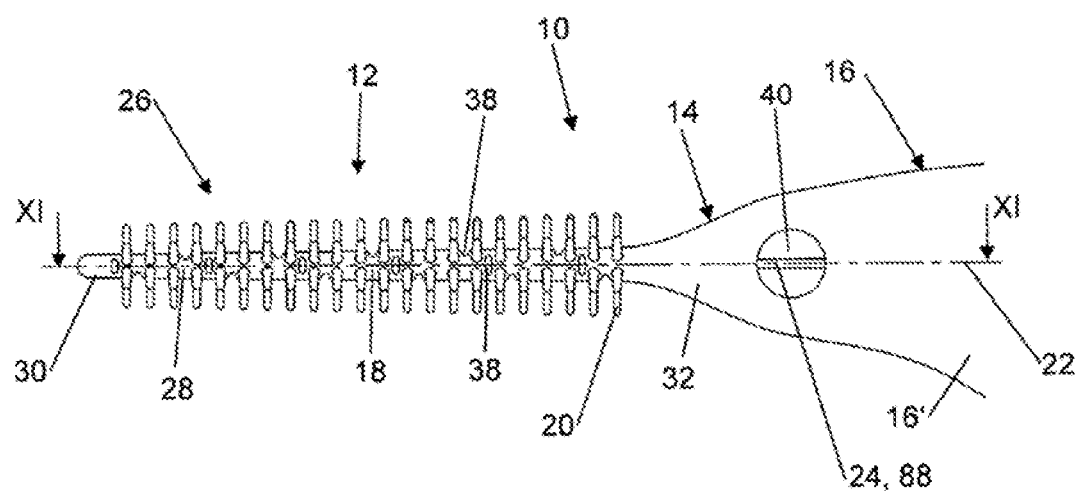
FIG. 7 shows the same representation as FIG. 2, but in an enlarged manner, of part of the interdental brush with the bristle trimming.
Figure 8:
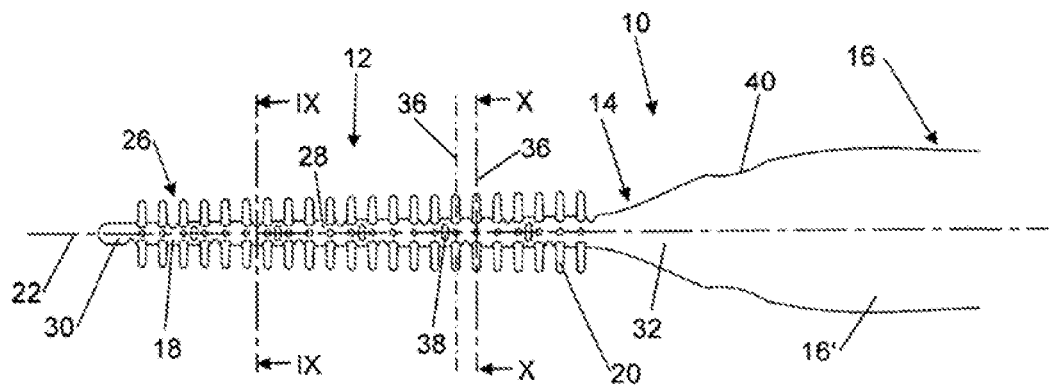
FIG. 8 shows a top view, and in an enlarged manner compared to FIG. 3, of the same part of the interdental brush as FIG. 7.
Figure 9:
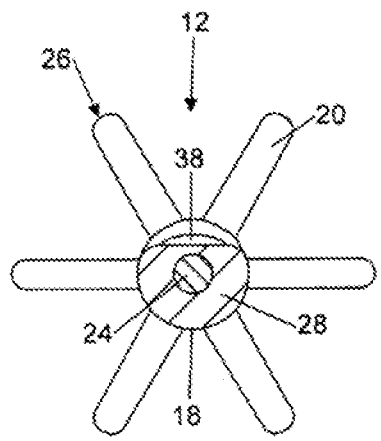
FIG. 9 shows a cross section of the interdental brush between two bristle planes along the line IX-IX of FIG. 8.
Figure 10:
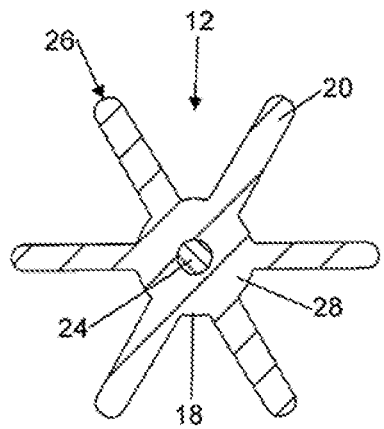
FIG. 10 shows a cross section of the interdental brush in a bristle plane along the line X-X of FIG. 8.
Figure 11:
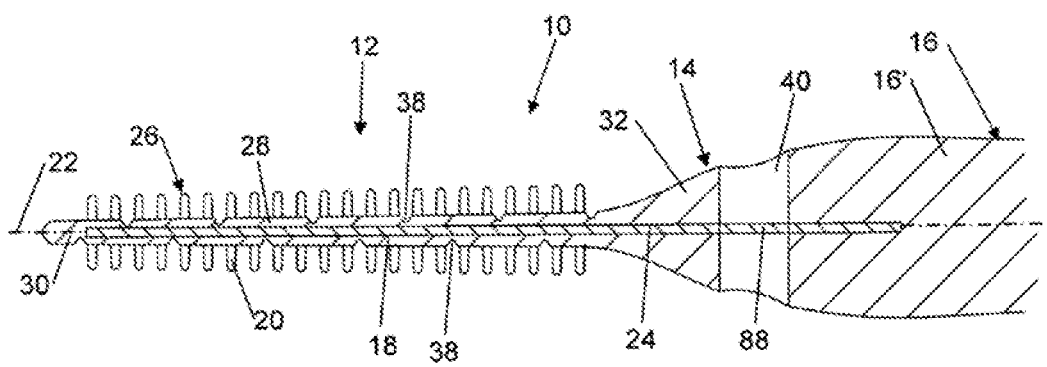
FIG. 11 shows a longitudinal section of the interdental brush along the line XI-XI of FIG. 7.

As can be seen in particular in FIGS. 9 to 11, an elongated support core 24, which is formed by a spring steel wire in the exemplary embodiment shown, extends in the interior of the bristle-carrying stem 18 and coaxially with respect to the longitudinal axis 22. It extends over the length of the bristle field 26 formed by the bristles 20 and over the neck portion 14. The support core 24, in the region of the bristle field 26, supports a layer 28 which forms a casing 28 here which surrounds the free end of the bristle support core 24 remote from the neck portion 14 by way of a cap-like extension 30. The casing 28 is realized in such a manner that when the interdental brush is used the support core 20 is not able to come into contact with the teeth or the gum. In this case, the cap-like extension 30 is preferably realized connecting to the casing 28 in a continuous manner.

The casing 28 and the bristles 20 are produced using the injection molding method from the same plastics material component from which—in the present case—the handle portion 16 and, in the neck portion 14 which connects the bristle field portion 12 to the handle portion 16, the neck shell 32 which surrounds the support core 24 are injected. The casing 28 with the extension 30, the bristles 20, the neck shell 32 and the handle portion 16 which forms the handle 16' are realized integrally with one another and are formed in one single injection molding step.

It is obviously possible, in a two-component or multiple-component injection molding method, for example to realize the bristle field portion 12 and the neck portion 14 with a first plastics material component in order to form the handle portion 18 with a second plastics material component or, for example, in the handle portion to inject a second component, for example a soft component, onto the part of the handle 16' formed by the first component in order to improve the grip.

The bristle-carrying stem 18 is realized widening in a (slightly) conical manner from the extension 30 up to the start of the neck portion 14.

The bristles 20 are arranged in bristle rows 34—in the exemplary embodiment shown there are six rows of bristles 34—which extend in the longitudinal direction 22 and in a radial manner and are uniformly distributed in the circumferential direction. In addition, the bristles are situated in bristle planes 36 which extend at right angles to the longitudinal direction 22 and are arranged spaced apart from one another in the longitudinal direction 22. In each case one bristle 20 of each bristle row 34 is situated in each of the bristle planes 36. For the sake of better clarity, the rows of bristles are only shown in FIG. 6 by way of the reference 34 and two bristle planes 36 are only shown in FIG. 8; there are twenty two bristle planes 36 in the exemplary embodiment shown.

The casing 28 comprises—in the exemplary embodiment shown—grooves, which extend in a straight-line always centrally in each case between two adjacent bristle planes 36 and at right angles to the longitudinal direction, define support points 38 and are at least approximately almost semicircular in cross section, said support points 38 being arranged from space to space in each case between two bristle planes 36 offset by 90° in a direction of rotation.

A thin layer, a film of the plastics material, is situated between the bottom of said grooves and the support core 24. However, it is also conceivable for the support core to be exposed at the bottom of the support points 38. However, it cannot come into contact with the teeth or the gum on account of the casing 28.

As further shown from the figures, the free ends of the bristles 20 lie along the outside surface of an imagined cone which widens (slightly) from the free end of the bristle field 26 in the direction of the neck portion 14 and the axis of which coincides with the longitudinal axis 22.

In the exemplary embodiment shown, the bristles 20 are circular in cross section and are realized tapering conically outward in the radial direction, the ends of the bristles being realized in a rounded manner, in this case in a hemispherical manner.

The cone angle in this connection is between 1° and 2°. Other cross sections for the bristles 20 are obviously possible and the ability of the bristles 20 to be removed from the mold in the injection molding process sets the limits in this connection.

Preferred dimensions for the bristle-carrying stem 18, the bristles 20, the support core 24, the casing 28 and the realization of the bristle field 26 are specified in the introduction.

It is also conceivable to realize the bristle-carrying stem 18 in a cylindrical manner, in particular in a circular-cylindrical manner and/or to arrange the free ends of the bristles 20 in the shell of an imagined circular cylinder which is concentric to the longitudinal axis 22, or, as is shown in conjunction with FIGS. 15 to 18, to provide them in the outside surfaces of two oppositely directed cones. Other forms are also possible.

The casing 28 merges continuously into the neck shell in the neck portion 14, where the outside cross section of the neck portion 14 widens continuously in the direction of the handle portion 16. In addition, the casing 28 in the free end region of the interdental brush 10 merges continuously into the cap-like extension 30.

The neck shell 32 comprises a passage 40 which extends at right angles to the longitudinal direction 22 and, in the present case, is circular-cylindrical and through the center of which the support core 24 extends. Said support core is visible from the outside. In a preferred manner, the handle end of the support core 24 does not lie in the passage 40 but rather an end portion of the support core 24 extends from the passage 40 in the direction toward the handle portion into the plastics material, from which the handle 16', the neck shell 32, the casing 28 with the extension 30 and the bristles 20 are produced; this is shown in particular in FIG. 11.

In the exemplary embodiment shown, the size of the handle portion 16 or of the handle 16' is that of a fingertip such that it can easily be held by the thumb and forefinger. Obviously, the handle portion 16 or the handle 16' can be given an arbitrary other form, in particular it can be realized in a longer manner.

Figure 12:
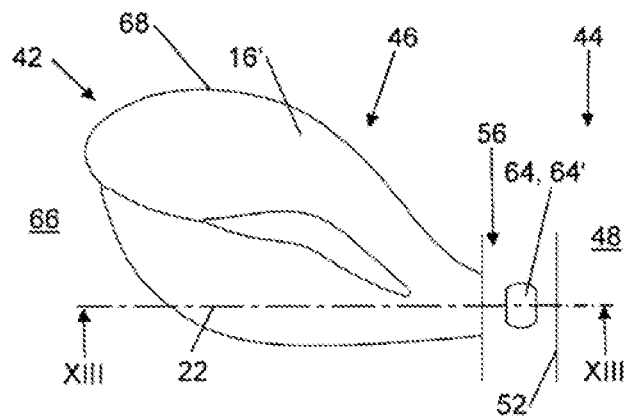
FIG. 12 shows a plan view, highly simplified, of a first part of the injection mold in the closed state and a second part of the injection mold with an open handle cavity and an injected handle of an interdental brush located therein.
Figure 13:
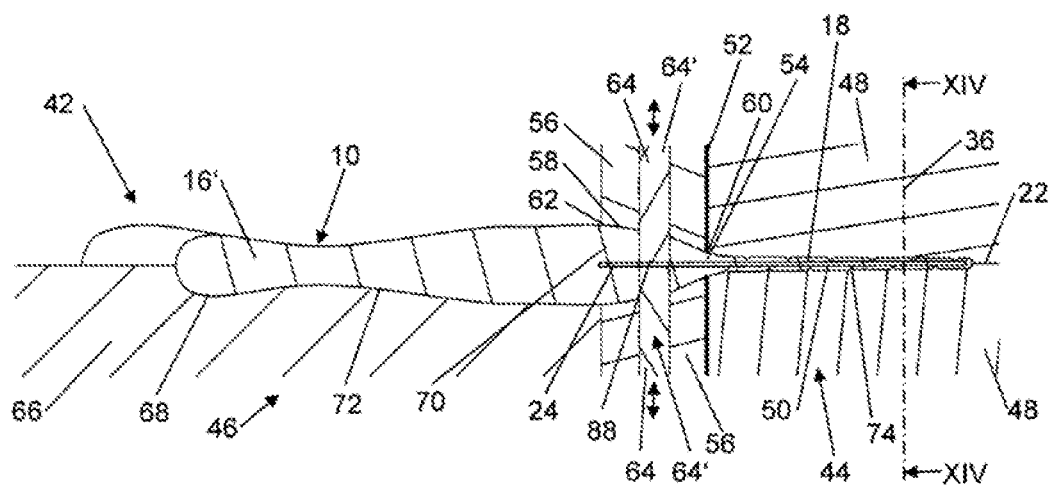
FIG. 13 shows a longitudinal section through the injection mold along the line XIII-XIII of FIG. 12 with an interdental brush produced therein, wherein the second mold part is shown in a part open position and the first mold part in its closed position.
Figure 14:
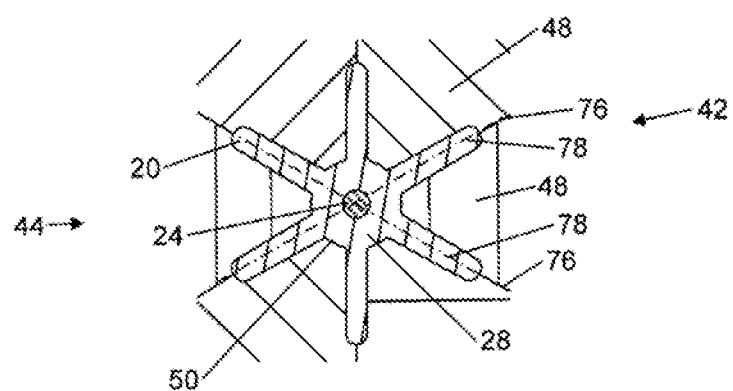
FIG. 14 shows a cross section through the first part of the injection mold which is in the closed state with an interdental brush in a bristle plane along the line XIV-XIV of FIG. 13.

FIGS. 12 to 14 show a highly simplified representation of an embodiment of an injection mold 42 for producing the interdental brush shown in FIGS. 1 to 11.

The injection mold 42 comprises a first mold part 44 for producing the bristle field portion 12 and the neck portion 14 as well as a second mold part 46 for producing the handle portion 16.

The first mold part 44, in the exemplary embodiment shown, is provided with six bristle field mold parts 48 which, in the closed state, define a bristle field cavity 50 for producing the casing 28, the bristles 20 and the cap-like extension 30. On an end face 52—this is facing a neck mold part 56 and consequently the second mold part 46—the bristle field cavity 50 comprises a bristle field cavity opening 54.

In addition, the first mold part 44 has associated therewith the two neck mold parts 56 which are realized in a beam-like manner and—in the closed state—define a neck cavity 58. On the side facing the bristle field cavity 50, the neck cavity 58 comprises a first neck cavity opening 60 which—in the closed state of the injection mold 42—is arranged at the bristle field cavity opening 54 and is aligned with the same; the neck mold parts 56 abut against the end face 52. In addition, on the side remote from the bristle field cavity 50 and facing the second mold part 46, the neck cavity 58 comprises a second neck cavity opening 62.

In addition, each of the neck mold parts 56 has associated therewith a clamping punch 64. With reference to the longitudinal direction 22 which is defined by the bristle field cavity 50, the clamping punches 64 are located radially opposite one another and are movable along a straight line, which extends at right angles to the longitudinal axis 22 and intersects it, from a rest position in which they are spaced apart from one another, toward one another into a clamping position which is shown in FIG. 13; said mobility is shown by double arrows.

The clamping punches 64 together form a fixing element 64' for fixing the support core 24.

The second mold part 46 comprises two handle mold parts which realize a handle cavity 68 in the closed state. For the sake of better clarity, only one of the handle mold parts 66 is shown in FIGS. 12 and 13.

On a side facing the neck cavity 58, the handle cavity 68 comprises a handle cavity opening 70 which—in the closed state of the injection mold—is arranged abutting against the second neck cavity 62 and is in alignment with the same.

In the closed state of the injection mold 42, the bristle field cavity 50, the neck cavity 58 and the handle cavity 68 together form an injection cavity 72.

As this is generally known and also proceeds from the interdental brush 10 shown in FIGS. 13 and 14, the bristle field cavity 50 is realized corresponding to the bristle field portion 12 of the interdental brush 10, the neck cavity 59 is realized corresponding to the neck portion 14 of the interdental brush 10 and the handle cavity 68 is realized corresponding to the handle portion 16 of the interdental brush 10. The dimensions of said cavities 50, 58, 68 consequently also proceed from the dimensions of the interdental brush 10 specified in the introduction. The forms of the cavities 50, 58 and 68 are produced from the interdental brush 10 shown in the figures.

As this can be seen in particular from FIG. 13, which also shows an interdental brush 10 produced in the injection mold 42 with the second mold part 46 open on one side, the support core 24 is held during the injection molding of the plastics material in a clamping manner by means of the clamping punches 64 which form the fixing element 64'.

If the plastics material is injected into the handle cavity 68, it flows though the neck cavity 58 into the bristle field cavity 50 without the support core 24 being able to be displaced in the longitudinal direction 22.

Over and above this, support elements 74, which are realized on bristle field mold parts 48 and correspond in a mirror-inverted manner to the support points 38 described in conjunction with the description of the interdental brush 10, are shown in FIG. 13. The support elements 74 protrude in the direction toward the interior of the bristle field cavity 50 and thus form the support points 38.

As can additionally be understood from FIG. 13, in the closed state of the injection mold 42 the bristle field cavity 50 merges continuously into the neck cavity 58 and said neck cavity merges continuously into the handle cavity 68 and they thus form the injection cavity 72. Obviously it is conceivable to realize steps, groove or channels at said transition points.

As can be seen from FIG. 14, the parting planes 76 of the bristle field mold parts 48 coincide with the longitudinal center planes 78 of the rows of bristles 34.

Over and above this, FIG. 14 shows the bristles 20 which are arranged in one of the bristle planes 36 and are produced integrally with the casing 28 of the support core 24 using the injection molding method.

In conjunction with FIGS. 12 to 14, the main features of the method can already be discussed.

The bristle field mold parts 48, in the exemplary embodiment shown, are transferred into the closed state of the first mold part 44 in the radial direction relating to the longitudinal direction 22, after which they form the bristle field cavity 54 which comprises the bristle field cavity opening 54 at the end face 52. The support core 24 (arranged in the longitudinal direction) is then inserted in the longitudinal direction 22 through the bristle field cavity opening 54 into the bristle field cavity 50 and is then held in situ by means of the clamping punches 64.

In this case, either the support core 24 is inserted the first into the neck mold part 56 and clamped and then, as result of moving the neck mold part 56 to the end face 52 of the bristle field mold parts 48, is inserted into the bristle field cavity 50 or the neck mold part 56 is moved to the bristle field cavity 50, the support core 24 is moved right through the neck mold part 56 into the bristle field cavity 50 and is then clamped.

As a result of injecting plastics material into the bristle field cavity 50, the casing 28 and consequently in an integral manner the bristles 20 are realized.

The plastics material is moved through the bristle field cavity opening 54 into the bristle field cavity 50.

In the exemplary embodiment shown, the support core 24 is held centrally in the bristle field cavity 50 by means of the support elements 74 which are distributed in the circumferential direction and in the longitudinal direction.

In the exemplary embodiment shown, the clamping punches 64 are associated with the neck mold parts 56 which—in the closed state—define the neck cavity 58 which is connected to the bristle field cavity 50. Consequently, the neck shell 32 is also injected simultaneously and integrally with the casing 28 and the bristles 20.

In this case, the plastics material flows around the clamping punches 64 and the passage 40 is realized in the neck shell 32.

In addition, in the exemplary embodiment shown, a handle 16' of the interdental brush 10 is also formed. To this end, the first mold part 44 with the support core 24, which is inserted into the bristle field cavity 50 and is held fast by means of the clamping punches 64, is moved to the second mold part 46 such that the second neck cavity opening 62 comes to lie at the handle cavity opening 70. With the handle mold parts 66 situated in the closed position and the handle cavity 68 consequently closed, the plastics material is injected into said handle cavity 68 which passes through the neck cavity 58 also into the bristle field cavity 50.

For removal from the mold, the handle cavity 68 is initially opened as a result of lifting the handle mold parts 66 off one another. The handle 16' is then removed out of the region of the handle cavity 68 by the first mold part 44 and the second mold part 46 being moved away from one another. After moving the clamping punches 64 from the clamping position in the radial direction outside the neck cavity 58 and opening the neck cavity 58 by moving the neck mold parts 56 away from one another as well as opening the bristle field cavity 50 as a result of moving the bristle field mold parts 48 away from one another in the radial direction, the interdental brush 10 is completely removed out of the mold.

FIGS. 15 to 18 shows perspective representations of the first mold part 44 for producing interdental brushes, as have been shown in the remaining figures and described further above. The difference to the figures already shown and described from the point of view mold design is that the cap-like extension 30 is molded in a separate part of the first mold part 44—in a cap mold part 80. Said mold part would be visible in FIGS. 15 and 16, but is not shown for reasons of clarity.

The differences on the product side are in the realization of the bristle field 26 and in the shape of the handle 16'. All the bristles 20 are, once again, arranged in six rows 34 of bristles which are distributed uniformly in the circumferential direction and all the bristles 20 are situated in bristle planes 36 which are arranged at a constant spacing from one another in the longitudinal direction 22. A bristle 20 of each row 34 of bristles is situated in each bristle plane 36. However, the free ends of the bristles 20 are no longer situated on one single conical outside surface, but rather they end in two oppositely directed conical outside surfaces which, with their smaller diameter, proceed from the axial ends of the bristle field 26 and meet at least approximately in the center.

Obviously, other realizations of the bristle field 26 with the injection mold 42 shown are also possible, as is also the one shown in FIGS. 1 to 11; only the bristle field cavity 50 has to be realized in a corresponding manner.

Figure 16:
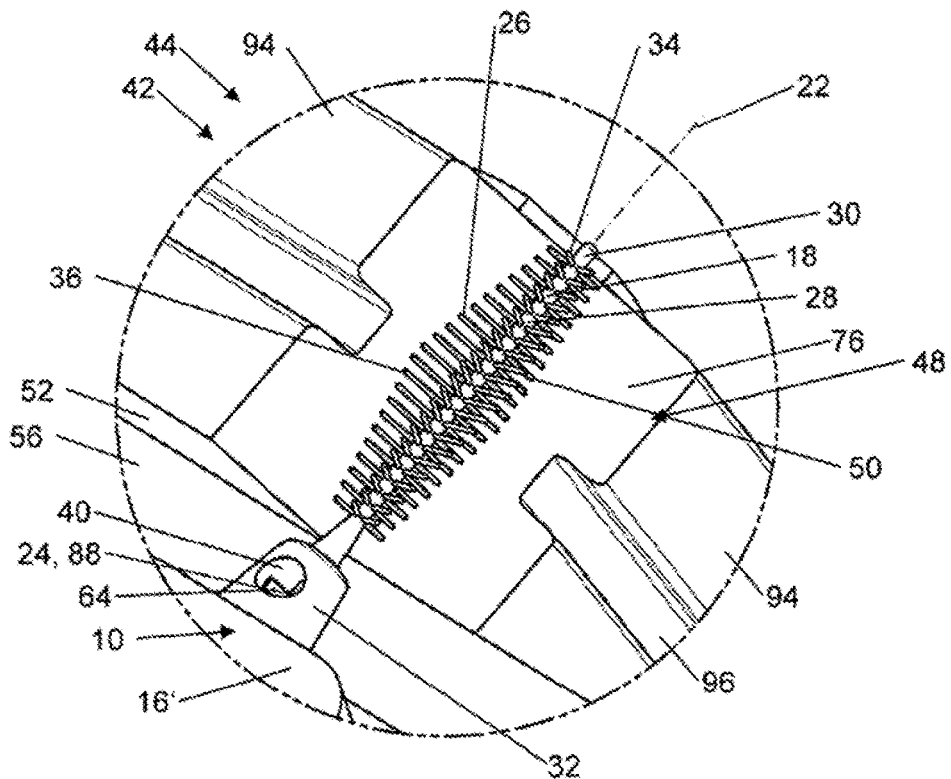
FIG. 16 shows the same representation as FIG. 15 of part of the first mold part with an interdental brush injected therein.
Figure 17:
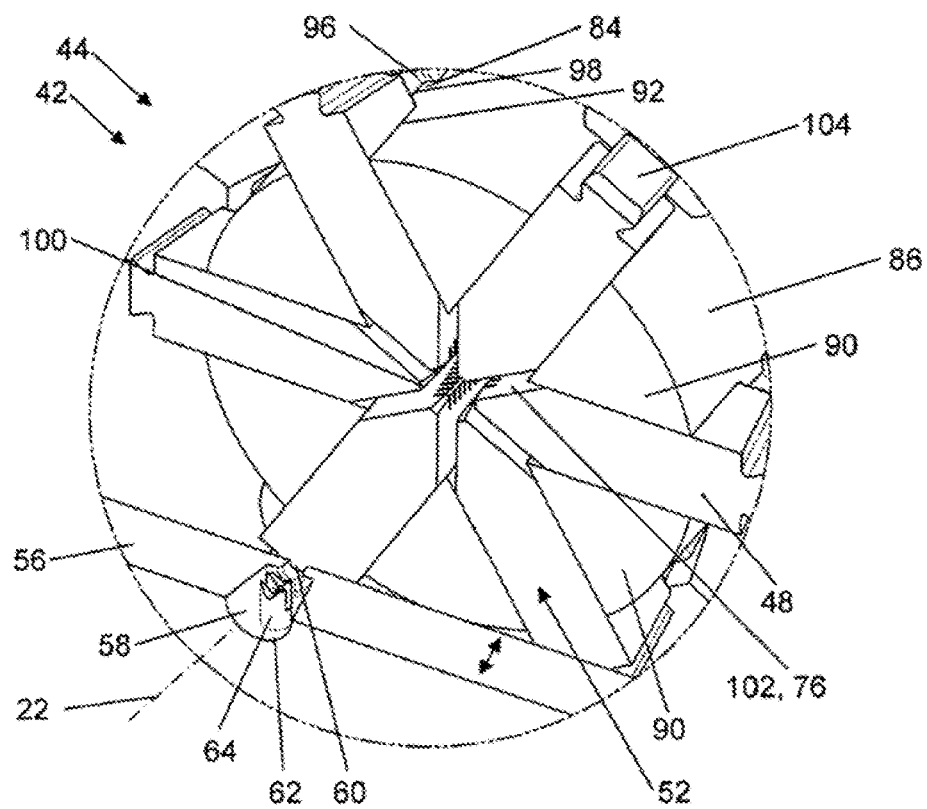
FIG. 17 shows a perspective representation of part of the first mold part in the open state in a further embodiment.
Figure 18:
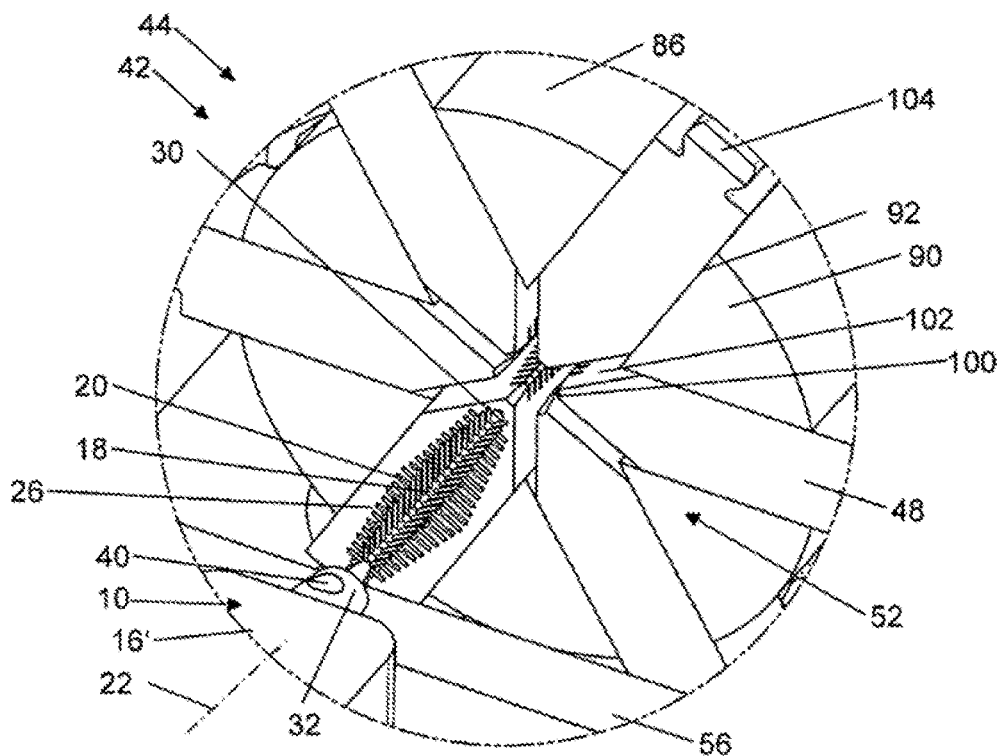
FIG. 18 shows the same representation as FIG. 17 of part of the first mold part also in the open state but with an interdental brush produced therein.

In addition, as can be seen in FIGS. 16 to 18, the handle 16' is realized in a cuboid manner with rounded edges. The handle cavity 68, which is formed by the second mold part 46, is molded in a corresponding manner. Otherwise the realization is the same as discussed in conjunction with FIGS. 12 to 14.

Figure 15:
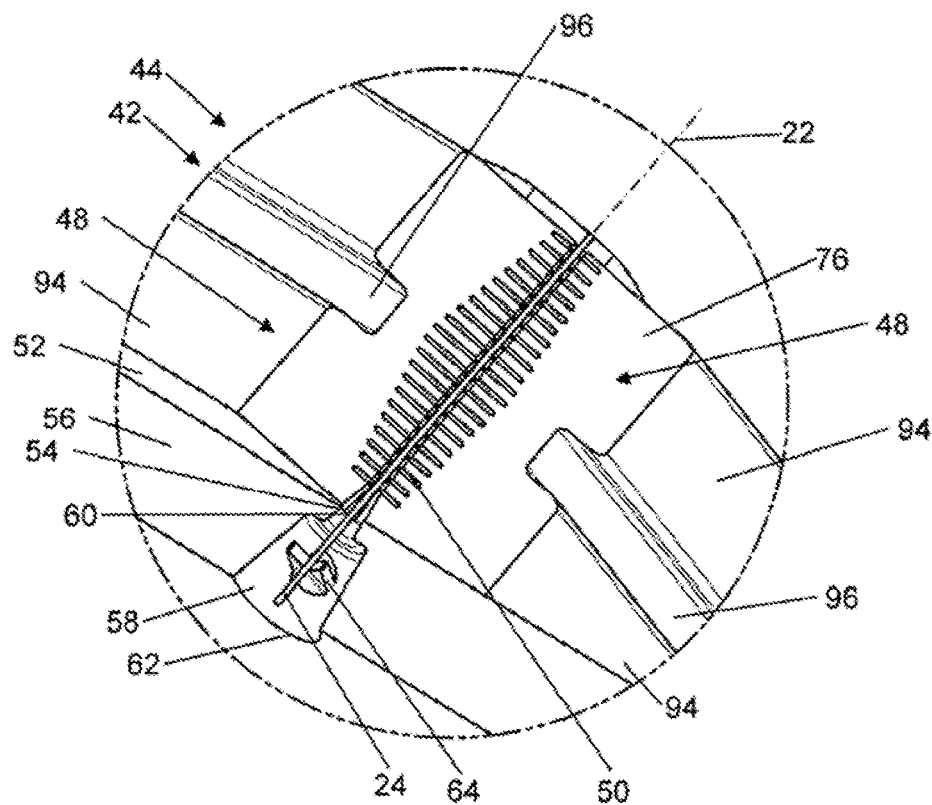
FIG. 15 shows a perspective representation of part of the first mold part with a bristle field cavity and a support core introduced into said bristle field cavity.

FIG. 15 shows a perspective representation of three of the six bristle field mold parts 48 which are situated in the closed state. The remaining three bristle field mold parts 48 and also the cap mold part 80 are not shown in order to make it possible to see into the interior of the injection mold 42. In addition, FIG. 15 shows one of the two beam-like neck mold parts 56 which, in the closed position of the second mold part 46, abuts in the axial direction against the bristle field mold parts 48, i.e. against the end face 52, in such a manner that the bristle field cavity opening 54 lies at the first neck cavity opening 60. In addition, FIG. 15 shows the one half of the neck cavity 58 into which protrudes the clamping punch 64 which is associated with said neck mold part 56. The two neck mold parts 56 (apart from the clamping punches) are formed in a mirror-inverted manner at least at the interface and in the closed state of the injection mold 42 define the neck cavity 58. Mirror-inverted molding is advantageous in order to enable uniform filling when introducing the plastics material in the injection molding process.

The cap mold part 80, which, when the plastics material is injected, forms a cap cavity 82 for forming the extension 30 which covers the free end of the support core 24, abuts against the bristle field mold parts 48 on the side of said bristle field mold parts remote from the neck mold part 56; see also FIGS. 1 to 11. The cap mold part 80 or the cap cavity 82 are preferably formed in one part. This means that the cap cavity 82 is developed as a blind hole and removal from the mold is possible only in the longitudinal direction 22. Consequently, said part is moved away from the bristle field mold parts 48 in the longitudinal direction 22 in the process before the bristle field 26 can be moved out of the remaining first mold part 44.

In addition, FIG. 15 shows the support core 24 which has been inserted in the longitudinal direction 222 through the neck cavity 58 and the bristle field cavity opening 54 into the bristle field cavity 50 once the bristle field mold parts 48 have been transferred into the closed state.

In addition, FIG. 16 shows dovetail-like guide slots 96 for the bristle field mold parts 48. The associated radial guides 84 are realized on a support body 86, the design of which can also be seen in FIGS. 17 and 18.

It must be mentioned just for the sake of completeness that the parting planes 76 once again lie in the longitudinal center planes 78 of the bristle rows 34. In addition, bristle field mold parts 48 comprise support elements 74 (compare FIG. 14) which serve for centering the support core 24 in the bristle field cavity 50.

FIG. 16 shows the same representation as FIG. 15 of an interdental brush 10 produced in the injection mold 42. In the passage 40, which is kept free of plastics material during injection molding by the two clamping punches 64, in the neck shell 32 it is possible to see, on the one hand, the exposed fixing portion 88 of the support core 24 (see also FIGS. 2, 4, 7, 11 and 14) and, on the other hand, the one clamping punch 64 which is still shown in the clamping position.

FIG. 17 shows the first mold part 44 in the open state. The roller-shaped support body 86 comprises (on the end face 52) an end plane 90 which extends at right angles to the longitudinal direction and faces the neck mold parts 56. The support body 86 comprises in the present example six guide grooves 92 which, with reference to the longitudinal direction 22 extend in the radial direction, are distributed uniformly in the circumferential direction and are open in the end plane 90. A bristle field mold part 48, which is mounted therein so as to be displaceable in the radial direction, is inserted into each of said guide grooves 92.

In FIGS. 15 and 16 (not shown in the figures) the side faces of the guide grooves 92, which abut against the side faces 94 of the bristle field mold parts 48, are provided with dovetail-like radial guides 84. It must be mentioned just for the sake of completeness that obviously the bristle-field mold parts 48 comprise correspondingly mirror-invertedly formed guide slots 96 into which the radial guides 84 engage. The named guide slots are shown in FIGS. 15 and 16.

In FIGS. 17 and 18, the radial guide slots 96 (one guide slot 96 per guide groove 92 and side face 94), which comprise an undercut in a dovetail-like manner, are realized from a bottom 98. The correspondingly mirror-invertedly formed radial guides 84 of the support core 86 are guided into said guide slots 96 of the bristle field mold parts 48, each bristle field mold part 48 comprising two guide slots 96, only one of which is visible in each case in the figures.

In the case of the embodiment (FIGS. 15 to 18), the object of the combinations consisting of guide slots 96 and radial guides 84 is to hold the bristle field mold parts 48 in position in the support body 86 in the axial direction with reference to the longitudinal direction 22 and to guide then so as to be movable in a translatory manner in the radial direction.

The bristle field mold parts 48 are realized in a cuboid manner, in the case of the embodiment shown in FIGS. 15 to 18 two oppositely situated sides (wide sides) in each case being provided with the guide slots 96.

In the end region which is located on the inside in the radial direction, the bristle field mold parts 48 are formed in a gable roof-like manner, the gables 100 extending in the longitudinal direction and the roof surfaces forming the parting planes 76. This means that in the closed state the roof surfaces 102 of adjacent bristle field mold parts 48 abut against one another. In the closed state of the bristle field mold parts, the gables 100 together form that part of the bristle field cavity 50 which realizes the bristle-carrying stem 18.

Correspondingly groove-like indentations which, in the closed state of the bristle field mold parts 48, form the part of the bristle field cavity 50 associated with the bristles 29, are realized in the roof surfaces 102. The roof surfaces 102 thus form part of the bristle field cavity 50.

In the end region located radially on the outside, the bristle field mold parts 40 comprise dovetail-like guide projections 104 which, in their imagined extension, enclose an acute angle with the longitudinal axis 22. The guide projections 104 are guided in mirror-invertedly realized sliding grooves of a control ring, which engages around the support body 68 and is displaceable back and forth in the axial direction by means of a drive element. In the one axial end position of the control ring, the bristle field mold parts 48 are situated abutting against one another in the closed state and form the bristle field cavity 50, as shown in a reduced manner in FIGS. 15 and 16. In the other end position of the control ring, the bristle field mold parts 48 are situated radially on the outside in the open position, as is shown in FIGS. 17 and 18.

As can be seen in addition from FIGS. 17 and 18 compared to FIGS. 15 and 16, the neck mold parts 56 are mounted so as to be displaceable in the longitudinal direction 22 relative to the bristle field mold parts 48 and also to the support body 86; longitudinal mountings are known in general and are not shown for reasons of better clarity. Drive members for the movement of mold parts are known in general and are not shown either.

In FIG. 18, the first mold part 44 is also situated in the open position, however in addition, as in FIG. 16, an interdental brush 10 which is produced with the injection mold 42 is shown. Said interdental brush is still held by the neck mold parts 56 which are still in the closed position and of which, however, only one of the neck mold parts 56 is shown.

The method of operation of the injection mold 42 is described further below in conjunction with FIG. 21.

FIGS. 19a and 19b show a preferred embodiment of the two clamping punches 64 which form a fixing element 64'.

In their end regions 110 which face one another, the clamping punches 64 comprise teeth 112 and where applicable molded tooth spaces 114, the teeth 112 engaging into the tooth spaces 114 of the other clamping punch 64 in each case in the clamping position.

In the exemplary embodiment shown, the clamping punches comprise a circular profile-shaped cross section, the ends facing one another being provided with a punch recess 116 which is v-shaped in cross section and extends in the longitudinal direction 22.

In the bottom of the punch recess 116 the clamping punches 64 comprise a channel 118 each which extends in the longitudinal direction 22, the two channels, with the clamping punches 64 in the clamping position, corresponding substantially to the outer contour of the support core 24, however being realized in such a manner that in the clamping position of the clamping punches 64 the support core 24 is able to be held clampingly by the channels 118.

In the case of the clamping punch 64 shown in FIG. 19a, the flanks 120 formed by the punch recess 116 are divided centrally in each case into two teeth 112 by a transverse recess 122. In the flanks 120, the transverse recesses 122 form tooth spaces 114 which are formed in a mirror-inverted manner with respect to the teeth 112 which are realized on the clamping punch 64 shown in FIG. 19b.

In the case of the clamping punch 64 shown in FIG. 19b, the two flanks 120 formed by the punch recess 116 are formed by two transverse recesses 122 which are located on the outside in the longitudinal direction 22 to form one tooth 112 each. Said transverse recesses 122 are formed in a mirror-inverted manner with respect to the teeth 112 of the clamping punch 64 shown in FIG. 19a.

If the two clamping punches 64, which lie in a common axis, are moved toward one another, the two teeth 112 of the clamping punch 64 shown in FIG. 19b move into engagement with the tooth spaces 114 of the clamping punch 64 shown in FIG. 19a. In a corresponding manner, the four teeth 112 of the clamping punch 64 indicated in FIG. 19a move into engagement with the outside tooth spaces 114 of the clamping punch 64 shown in FIG. 19b.

In the clamping position, consequently, the support core 24 in the fixing portion 88 is completely surrounded by the clamping punches 64. Over and above this, in the clamping position the two clamping punches 64 form a continuous profile which serves for realizing the passage 40 during injection molding.

FIG. 20 shows a schematic representation of a possible embodiment of the injection mold 42 with one single stationarily arranged second mold part 46 and four further mold parts 46 which are rotatable about a rotational axis 124 and after a rotation are movable in each case about 90° one after another to the second mold part 46.

The second mold part 46 comprises the two handle mold parts 66 which, in the closed state, realize the handle cavity 68. It must be mentioned at this point that the first mold parts 44 and the second mold part 46 are in each case able to realize several corresponding cavities in order to produce several interdental brushes simultaneously, as is known in general from toothbrush production.

On the side facing the second mold part 46, each of the first mold parts 44 comprises the two neck mold parts 56 which, in the closed state, realize the neck cavity 58 or the neck cavities 58. On the side remote from the second mold part 46, each first mold part 44 comprises a cap mold part 80 with the corresponding cap cavity or cap cavities 82. The bristle field mold parts 48 are situated in each case between the neck mold parts 56 and the relevant cap mold part 80. The first mold parts 44 are realized as described further above and shown in the preceding figures. The neck mold parts 56 are movable relative to the bristle field mold parts 48 in the direction of the double arrows shown—consequently in the direction of the rotational axis 124 or in the longitudinal direction 22.

The realization of the injection mold 42 according to FIG. 20 enables short cycle times for producing the interdental brushes 10 as each first mold part 44 assumes four different positions in which different treatments are able to be performed in each case, as is shown below in conjunction with FIG. 21.

In a first position A, the bristle field cavity 50 is closed by the bristle field mold parts 48 being transferred into the closed state. In addition, the neck mold parts 56 are moved toward one another into the closed position and to abut against the bristle field mold parts 48 in the longitudinal direction 22. The clamping punches 64 or the fixing element 64' are held spaced apart from one another in the rest position, outside the neck cavity 58.

Said first mold part 44 is then moved into a second position B—in the case of the embodiment shown in FIG. 20 as a result of rotating by 90° about the rotational axis 124. In said second position B, the support core 24 is inserted through the neck cavity 58 and then the bristle field cavity opening 54 in the longitudinal direction 22 into the closed bristle field cavity 50, after which the clamping punches 64 are moved toward one another or the fixing element 64' is moved into the clamping position.

The support core 24, in this case, can be supplied to the process as a part which is already present in the correct length (for example a cut part) or as an endless part. In this case, in the second case it is still necessary to cut the support core 24 to the correct length in the process. In addition, it is also possible to form the support core 24 from a plastics material and to do this, for example, in a separate or integrated injection molding process and in this way an interdental brush could be completely manufactured from plastics material.

The first mold part 44 is then moved, once again as a result of rotation, with the support core 24 inserted and secured therein into a third position C in which the first mold part 44 is situated at the second mold part 46. The handle cavity 68 is closed as a result of moving the handle mold parts 66 toward one another. In addition, the first mold part 44 and the second mold part 46 are moved toward one another and into position abutting against one another such that the handle cavity 68 together with the neck cavity 58 and the bristle field cavity 50 including the cap cavity 82 form the injection cavity 72.

The plastics material is then injected into the handle cavity 68, as a result of which the handle 16' is realized in the handle cavity 68, the neck shell 32 is realized in the neck cavity 58, the casing 28 and the bristles 20 are realized in the bristle field cavity 58 and the extension 30 is realized in the cap cavity 82.

If the plastics material is hardened at least so that it is dimensionally stable, the handle cavity 68 is opened as a result of moving the handle mold parts 66 away from one another. As a result the handle 16' is removed from the mold. In addition, the first mold part 44 and the second mold part 46 are moved away from one another. The first mold part 44 is then moved into a fourth position D as a result of rotation.

In said position D it is possible to inject a second component, for example from a hard or soft component, on the already produced handle 16'. If this is desired, a third mold part of the injection mold 42, which can be realized identically to the second mold part 46, is situated at said fourth position D, however only the cavities next to the receiving means for the already produced handle 16' being realized for the injecting of the further components.

The already produced handle 16' protrudes beyond the neck mold parts 56 and in the fourth position D passes into the relevant cavity. The mold parts are moved toward one another, the cavity is closed and the second component is then injected. Once said component has hardened at least in part, the further handle cavity is opened and the first mold part 44 is then moved into the first position again, the position A. In said position, the bristle field mold parts 48 are transferred into the open state, as a result of which the bristle field portion 12 and the handle portion 16 of the interdental brush 10 are exposed.

As a result of moving the neck mold parts 56, which are in the closed position, in the longitudinal direction away from the bristle field mold parts 48, the interdental brush 10 is removed from the bristle field cavity 50. The neck mold parts 56 and the clamping punches 64 or the fixing element 64' are then moved away from one another and beforehand, at the same time or afterwards the clamping punches 64 are transferred into their rest position. The interdental brushes 10 are free and are able to be removed, for example by means of a gripper (for example on a robot), from the injection mold 42.

Depending on the development, the gripper holds the interdental brushes 10 as early as when the neck mold parts 56 and the clamping punches 64 are opened. As a further development, it is possible for the produced parts simply to be dropped depending on the design of the injection mold.

The first mold part 44 is or rather its parts are then closed again as described at the beginning and a new production cycle can start.

The embodiment shown in FIG. 20 with four first mold parts 44 has consequently the advantage of a large production capacity, whilst the first component of an interdental brush 10 is being injected, treatments are being performed in the remaining positions.

If there is no provision for a second component to be injected onto the handle 16', the fourth position can be omitted, as is shown in FIG. 21 by way of a dotted line. In this case, the injection mold 42 comprises in an advantageous manner three first mold parts 44 which are rotated about the rotational axis 124 from position to position in a preferred manner by 120° in each case.

In this case, however, it is also possible, for example, to split the activities of one position into several positions. For example, opening and product removal can be grouped together at position A and separated from closing and moving the mold parts together.

In addition, it is conceivable, as indicated in FIG. 21 by way of the dotted line 126', to insert the support core 24 into the closed bristle field cavity 50 in the first position A.

In this case it is advantageous—if no second component has to be injected onto the handle 16'- to provide two first mold parts 44 which are rotated in each case about 180° about the rotational axis 124 into the corresponding positions (A, C). However, if there is provision for the injecting of a second component, the injection mold 42, in a correspondingly preferred manner, comprises three first mold parts 44.

In a preferred manner, the first mold parts 44 in each case are arranged distributed uniformly in the circumferential direction with respect to the rotational axis 124 in the manner of the blades of a helicopter rotor.

Details of possible further treatments of the interdental brushes 10 produced as described above are provided in conjunction with FIG. 22.

FIG. 22 shows how the injection molding process and the further production steps are incorporated into the entire production process when a so-called inline solution is used in the production process, i.e. the production steps are linked directly together. The advantages provided by said production method are obvious. For example, they are economic, no intermediate storage is required and damage to the bristle field can be quasi ruled out.

For example, it is possible to post-process the injected interdental brushes 10 in several steps and then to package them directly. In addition, it is possible to provide buffering between the several processing steps. The buffering serves for the purpose of absorbing oscillations in the output between the previous and the subsequent process steps.

Thus it is possible for the injected interdental brushes 10 to be provided, for example, with lettering, for example as a result of embossing or printing, in a next step after the injection molding. The post-processing can also relate to the bristle field, for example the interdental brush 10 can undergo more bending of the bristle-carrying stem 18. The treatment of the bristle field 26 with substances, for example dental solutions, toothpaste or antiseptics, is also possible. The influence of heat on the bristle field 26 is also possible as is distortion of the bristle field 26 so that it obtains a torsion shape.

The named processes are possible prior to or after buffering or also directly prior to the packaging of the interdental brushes 10.

Further processes are also possible inline before the interdental brushes 10 are packaged.

It is also conceivable to process the produced interdental brushes 10 further offline. To this end, the individual steps can be completely separate and take place independently of one another. In this case, it is possible for each intermediate product to be stored before it is processed further.

Along with the declared variant that the product is produced completely in the injection mold and is a stand-alone product, it is also possible not to produce the complete product. In this case, it is possible, in place of the complete handle 16', to develop an interface geometry which fits onto a mirror-invertedly formed part of a handle. In this case, the brush part is exchangeable and is clicked into the handle or fastened in another manner so as to be releasable again.

In addition, it is also possible to form the interdental brush in as identical a manner as possible to an existing screwed-in brush, for example such that a shaft is produced from plastics material using the injection molding method. The achievement here is that existing screwed-in brushes without a brush handle can be replaced 1:1. This is used, for example, in handles into which simple screwed-in brushes can be inserted, the screwed-in brushes being held/clamped as a result of bending the extension of the bristle-carrying stem.

It is also possible to apply the co-injection method to the production of the named interdental brushes. This would mean that two components are injected for the production in the first cavity of the injection mold. Specifically, a first component is injected, but it does not fill the cavity completely. After partial hardening, a second material component is injected by means of the same injection point such that said component either displaces the existing component in part and takes up space in the interior of the existing component or the additional component breaks through the existing component. Thus it is possible to produce a two-component part in one single injection mold cavity. In this way, for example, the handle and the bristles can comprise different colors or different materials can be used for the handle and the bristles.

FIGS. 23 to 29 show a variant of an interdental brush 10 in which the support core 24 is also produced from a plastics material using the injection molding method.

The interdental brush 10 comprises a bristle field portion 12 with a bristle field 26, a neck portion 14 with a neck element 32 as well as a handle portion 16 with a handle 16'. A bristle-carrying stem 18, from which the bristles protrude, extends in the case of this variant also in a straight line over the entire length of the bristle field portion 12 and establishes a longitudinal direction 22; the dot-dash line specifying the longitudinal direction once again defines the longitudinal axis.

In the present case, the handle 16', the neck element 32 and the support core 24 are injected integrally from a plastics material. The support core 24, which connects to the neck element 32 on the side remote from the handle 16, comprises a smaller diameter than the neck element 32 and the support core 24 preferably tapers as the distance between it and the neck 32 increases. A casing 28, which surrounds the free end of the support core 24 remote from the neck portion 14, is injected around the support core 24.

With regard to as efficient handling as possible, the handle 16' comprises a flattened form. The flattened form can be present, for instance, in the form of a small plate which, where applicable, comprises trough-shaped indentations on the top and/or bottom surface for accommodating finger tips (not shown). Nubs can also be arranged in the trough-shaped indentations in order to increase the grip further. The bristles 20 are or the bristle field 26 is injected together with the casing 28. The casing 28 and the bristle field 26, in this case, are preferably injected from a plastics material other than that of the handle 16', the neck element 32 and the support core 24. In addition, for better ergonomics/functionality, the handle 16' can be provided with a further plastics material component, in particular a soft component.

In the present case, the bristle field 26 consists of bristles 20 which protrude substantially from three sides (or from three side portions) of the interdental brush 10. One side (or one side portion) remains free of bristles in the case of this variant. As can be seen, the bristles 20 do not protrude radially from the longitudinal axis 22 of the support core 24 in each case, rather the individual rows 34 of bristles, which extend in the longitudinal direction 22, are arranged in each case at least approximately parallel or at a 90° angle with respect to one another. As can be seen for instance in FIG. 27, the top three, approximately parallel rows 34 of bristles follow the tapering of the support core 24 or of the casing 28 (which has a constant thickness uniformly and consequently extends around the support core 24 also with corresponding tapering) and converge somewhat to a tip whilst the side rows of bristles protrude perpendicularly from the support core 24 and lie in a common plane. Obviously other types of angular constellations between the rows 34 of bristles are conceivable in this variant also.

FIG. 29 shows a cross section which is alternative to FIGS. 23-28 in the region between the rows of bristles. In this case, the support core 24 emerges out of the casing in the region of the bristle field portion 12 and thus forms at least part of the actual rear side of the bristle field 26. In this case, therefore, the support core 24 is surrounded by a part casing or layer 28 with the exception of the bottom side.

The support core 24 is developed in a preferred manner in the form of a rounded trapeze. The support core can, however, also be developed in a triangular manner and be surrounded by the casing 28 completely on two sides and absolutely not or only in part on one side. The support core can, however, also comprise a round cross section.

The support core 24 can accordingly also realize a three-dimensional geometry which deviates from the preceding embodiments as it is formed together with the handle 16' of the interdental brush 10.

The production of an interdental brush 10 according to FIGS. 23 to 29 is somewhat simpler than that of the preceding embodiments. The support core 24 can be produced, for example, in a cavity of an injection mold in which subsequently using the two-component or multiple-component injection molding method the bristle field is also produced. In this case, as in the preceding embodiments, the support core 24 is inserted in the longitudinal direction 22 through the bristle field cavity opening 54 into the closed bristle field cavity 50. In addition, it is also possible to produce the support core 24 in a separate injection mold and to supply it to the injection mold in which the bristle field is molded and to insert it correspondingly into the injection molding cavity.

The fixing of the support core 24 in the injection mold is effected in a preferred manner in the region of the handle 16', at points at which only one plastics material component is present (i.e. in particular not at points at which a soft component is also present for instance). Depending on the development, the fixing can be effected just by means of the walls of the injection mold cavity—without separate clamping punches being necessary for this. The fixing element is then formed in each case by the cavity wall. The injection point 51 of the plastics material component, which forms the casing 28 as also the bristles 20, is situated in a preferred manner at the front end of the handle 16'. In this way, the plastics material component of the casing 28 overlaps a small part of the surface on the handle 16', whilst on the rear side of the interdental brush 10 on the neck element 14 it covers a substantial part of the surface of one side before it finally completely covers the surface in the bristle field portion 26 (cf. FIG. 25).

In addition, it is possible to combine the injected bristles 20 with screwed-in bristles such that, for example, screwed-in bristles are present in the front part of the interdental brush 1. To this end, where applicable, a screwed-in brush, which comprises screwed-in bristles at its front end and is provided with twisted wire at its rear part, is created in a first step. Said part is inserted into the injection mold cavity, clamped and also clamped in front of the region of the screwed-in bristles. The twisted wire is then injected around and provided with injected bristles 20.

The product group 200 according to the invention shown in FIGS. 30-31 comprises several brushes of the embodiments of the invention shown in FIGS. 23-29. A product group preferably consists in each case of five brushes as shown. As can be seen, the adjacent brushes in this case are connected together in the region of their handles 16' by means of two material bridges 128.

The material bridges 128, depending on the development of the handle 16', are the same length or different in length. They can also comprise in each case a predetermined breaking point S, for example in the form of a perforation or an incision or material weakness at which the individual brushes are able to be separated simply and cleanly from one another.

The injection point 51" of the second component is situated at the front end of the handle 16' facing the neck element 32. The second plastics component, in other words, is injected onto the front end of the handle 16' facing the neck element 32, the second plastics material component overlapping a small part of the surface on the handle 16', whilst it covers a substantial part of the surface on the rear side on the neck element 32 and covers the surface of the support core 24 completely, or else with the exception of one bottom side (cf. FIG. 29).

The second plastics component is introduced into the product at a separate injection point 51" per interdental brush 10. The first plastics material component is introduced by means of the injection point 51'. In this connection, it is possible for there only to be one injection point 51' of the first component for a product group, or else for there to be several injection points 51'. With reference to their arrangement on the products of the product group, the injection points are preferably arranged in a uniform or symmetrical manner. In addition, the injection point 51' or 51" is always situated at the same position inside the individual product. Never more than one injection point is preferably used per plastics material component per product.

Apart from this, the further structural elements/components correspond to the structural elements/components shown in FIGS. 23-29. A hot runner system is regularly used for said embodiment. The use of a cold runner system is conceivable.

A brush or interdental brush 19 according to the invention which, once again, comprises a handle 16' from which the neck element 32 and the support core 24 extend (covered by the layer/casing 28 in this case), is shown in FIGS. 32-34. As can be seen, three converging rows 34 of bristles (the center one of which extends along the longitudinal axis 22), which define the bristle field 26 together with the two rows 34 of bristles which protrude substantially horizontally from the support core (or bristle stem 18), are arranged on the top surface of the bristle stem 18.

In this case, the length of the bristles 20 reduces in the direction of the end of the bristle stem 18 remote from the neck element 32. As can be seen in particular also in FIG. 34, the two rows 34 of bristles, which protrude substantially horizontally from the support core, are arranged in a plane below the longitudinal axis 22 of the support core 24.

On account of the fact that, in the present case, the support core as well as the bristle stem 18 taper in the direction of their end remote from the neck element 32, the plane in which lie the rows of bristles arranged substantially horizontally, is, where applicable, not completely parallel to the longitudinal axis 22. The handle 16' of the brush, in the present case, is realized in a flat manner. The cap-like extension 30 of the layer/casing 28 once again surrounds the free end of the support core remote from the neck element 32. The injection point 51" for the second plastics material component is situated either at the free end of the support core or else on the end of the support core facing the neck element 32 (i.e. in the bristle field cavity opening). No second plastics material component is applied onto the handle 16' and onto the neck element 32 of the individual brushes. A cold runner system is regularly used in the case of said embodiment. The injection point 51" lies in a preferred manner at the free end of the support core.

The second plastics material component, as shown in FIGS. 32 and 33, may be received in a hole 161 in the handle 16' where it forms a portion with increased grip. Different developments are conceivable with regard to embodiments with the hole 161 in the handle 16'. There can be one or several holes 161 present, for example there can be one large hole and several small holes. The holes 161 are preferably developed in a circular or oval manner, however, n-angle or polygonal holes (with rounded corners for example) are conceivable.

The product group 200' according to the invention shown correspondingly in FIGS. 35 and 36 simply comprises a material bridge 128 between the handles 16' of the adjacent brushes or interdental brushes 10. Said material bridges are also formed from the first plastics material component and can comprise a predefined breaking point S in the form of a perforation or an incision or a material weakness.

No second plastics material component is applied onto the handle 16' or onto the neck element 32 of the individual brushes. The connection between the brushes of the product group 200' by means of the individual material bridges 128 between the handles 16' as well as the above-described geometry of the bristle field 26 can be seen again in the frontal view according to FIG. 37. The support core 24 is realized in a trapezoidal manner in cross section. Once again, each product group 200' preferably consists of five brushes.

In the case of the brush shown in FIGS. 38 and 39, a trough in the handle 16' can be provided with a structure such as, for instance, a structure on the edge 162 or on the bottom of the trough. The form of the structure can comprise nubs, grooves, lamellae 163 or similar as well as combinations thereof.

In the case of the brush shown in FIGS. 38-40, two rows 34 of bristles, which converge in the direction of the end of the bristle stem 18 remote from the neck element 32 (said bristle stem tapering in this direction as does the support core) and which, as illustrated in FIG. 41, protrude from the top surface of the support core in an outwardly inclined manner (i.e. not substantially vertically but also not radially), are arranged on the top surface of the support core 24 or bristle stem 18. In addition, once again there are two rows 34 of bristles which protrude substantially horizontally from the support core 14 or from the bristle stem 18.

In this case too, the cap-like extension 30 of the layer/ casing 28 surrounds the free end of the support core or of the bristle stem 18 remote from the neck element 32. In the case of said brush, the second plastics material component is injected onto the rear end of the handle 16' remote from the neck element 32, the second plastics material component overlapping a large part of the surface both at the front and at the rear on the handle 16', whilst it covers a considerable part of the surface on the rear side on the neck element 32 (cf. FIG. 29) and completely covers the surface of the support core 24.

It is, however, also possible for the bottom side of the support core not to be covered by the second plastics material component analogous to FIG. 29. On the front and on the rear side in each case, the handle 16' of the brush comprises a trough-shaped indentation 17 for a better hold, as can be seen in FIG. 40. On the rear side of the handle 16' (cf. FIG. 39) the second material component is guided in an elongated indentation 19 of the neck element 32. As the injection point 51" lies at the rear end of the handle 16', the second plastics material component thus flows from there through the trough-shaped indentation 17 of the handle and the elongated indentation 19 of the neck element 32 up to the support core where it finally (in the corresponding bristle field cavity) realizes the layer or casing 28 with the bristles 20. FIG. 38 shows the support points against which the support elements 74 of the bristle field cavity 50 abut (cf. analogously FIG. 13) and prevent the support core 24 from being moved in the radial direction and, where applicable, the openings for the individual bristles 20 to be formed from closing. A hot runner system is provided as a rule for said variant so that the second plastics material component does not harden prematurely along its relatively long flow path.

A product group 200" with brushes which are very similar to the brushes shown in FIGS. 38-41 is shown in FIGS. 42-43. Just the form of the handles 16' deviates from the oval handle shape according to FIGS. 38-40.

The present handle shape of the brushes is substantially rectangular and comprises a side indentation 131 in each case at the sides. This is related to the fact that in the present case the individual brushes of the product group 200" are connected by means of two material bridges 128, 128', the material bridges 128 being formed from the first plastics material component and the material bridges 128' being formed from the second plastics material component.

The material bridges 128 from the first plastics material component are arranged in each case in the rear region of the handle 16' and the material bridges 128' from the second plastics material component are arranged in each case in the front region of the handle 16'. In the case of said development, an injection point for the second plastics material component does not have to be present on each brush.

The handles 16' (including the neck element and support core) which are injected initially from the first plastics material component are arranged closely together. In addition, the handles 16', in the region of the second material bridge 128' (to be subsequently injected), comprise transitions 132 on the top or rear surface, by means of which the second plastic material component can be distributed. Consequently, an injection point for the second plastics material component does not have to be provided on each product or each brush. Said product group 200" preferably also consists of five brushes in each case.

Finally, FIGS. 44-46 show a further variant of an interdental brush which comprises on the rear end of the handle 16' a notch 134 for placing the brush onto a corresponding holder 140 or, for instance, onto a beaker or a glass. The embodiment which is shown schematically as an example is an interdental brush with an extrusion-coated wire or support core 24 which projects from the neck element 32 and carries a bristle field 26.

The material of the at least one plastics material component for the handle 16' can be chosen such that the two side flanks 136 (or clamping arms) of the handle 16' surrounding the notch 134 are developed in a resilient manner and thus, where applicable, are able to be mounted onto the holder 140, the glass or the beaker among other things in a positive locking and frictional locking manner. The handle 16' or the handle 16' and the neck element 32 can also be injected from two (or more) different plastics material components. In the preferred embodiment, the notch 134 is extrusion-coated with a border 135 of a second or further plastics material component which regularly provides a soft component. As a result, the hold of the brush on the respective holder 140 can be improved further. In the present case, the border 135 is realized in an H-shaped manner, which can be advantageous for the handling. The bottom ends of the side flanks 136 are preferably completely surrounded by the soft component. As can be seen in the side view according to FIG. 45, the side flanks 136 taper toward their bottom end.

A notch 134 and border 135 of this type can obviously also be provided in an interdental brush with a support core injected from plastics material, as is illustrated in FIGS. 23-43 (as well as in corresponding product groups).

Apart from this, in the case of the embodiments according to FIGS. 23 to 46, the injection point for the first plastics material component 51' lies in a preferred manner in the handle region. Depending on the development, one or more injection points per product or product group are conceivable. Preferably one injection point is provided, the plastics material component being distributed in the individual product and by means of the material bridges.

The respective brushes according to FIGS. 23 to 46 can be injected in each case in the parting plane of a two-part injection mold and can be easily removed from said mold, which enables particularly cost-effective and efficient production. The injection mold for said embodiment regularly does not need any neck mold parts or clamping punches either.

The development variants shown in said document are obviously given by way of example. Within the framework of the present invention, the individual characteristics and elements of said development variants can easily be combined with other development variants.

The descriptions given for specific figures can also obviously be transferred to other figures which show identical or similar characteristics and in which the characteristics are not described in the same detail.

Included in a further development:
1. A method for producing a brush, in particular an interdental brush (10), using the injection molding method, which brush comprises a bristle-carrying stem (18), which defines a longitudinal direction (22) and has an elongated support core (24), and a bristle field (26) with bristles (20) which protrude from the bristle-carrying stem (18), said method having the following steps:
    closing a bristle field cavity (50) of an injection mold (42) which comprises a bristle field cavity opening (54) and serves for producing the bristle-carrying stem (18) and the bristles (20),
    inserting the support core (24) in the longitudinal direction (22) through the bristle field cavity opening (54) into the closed bristle field cavity (50),
    fixing the support core (24) inserted into the bristle field cavity (54) to avoid a movement of the support core (24) in the longitudinal direction (22) and
    introducing plastics material into the bristle field cavity (50) to realize a layer on the support core (24) and the bristles (20) which protrude from said support core in an integral manner.
2. The method as claimed in development 1, including:
    preparing an injection mold (42) having a fixing element (64') and at least two bristle field mold parts (48) which—in the closed state—define the closed bristle field cavity (50), wherein the bristle field cavity (50) comprises the bristle field cavity opening (54) on an end face (52),
    moving the bristle field mold parts (48) into the closed state;
    then introducing the support core (24) in the longitudinal direction (22) through the bristle cavity opening (54) into the closed bristle field cavity (50),
    fixing the support core (24) by means of the fixing element (64') and
    introducing the plastics material into the bristle field cavity (50) for realizing the bristles (20) and the layer on the support core (24).
3. The method as claimed in development 1 or 2, wherein the support core (24) is fixed outside the bristle field (26) to be formed, preferably outside the bristle field cavity (50) and the plastics material is introduced through the bristle field cavity opening (54) into the bristle field cavity (50).
4. The method as claimed in one of developments 1 to 3, characterized in that the injection mold (42) comprises at least one neck mold part (56) and the support core (24) is fixed in the region of the neck mold part (56).
5. The method as claimed in development 4, characterized in that the injection mold (42) comprises two neck mold parts (56) which—in the closed state—define a neck cavity (58) with a neck cavity opening (60), when the plastics material is injected the neck cavity opening (60) is arranged at the bristle field cavity opening (54) and a neck layer, preferably a neck shell (32), is injected about the support core (24) at the same time as the layer (28) and the bristles (20) are integrally injected.
6. The method as claimed in one of developments 1 to 5, wherein the support core (24) is clampingly fixed by means of a pair of clamping punches (64) which can be moved from a rest position toward one another into a clamping position.
7. The method as claimed in development 5, wherein the support core is clampingly fixed by means of a pair of clamping punches (64) which can be moved from a rest position toward one another into a clamping position during the injection molding and the clamping punches (64) project into the interior of the neck cavity (58) in the clamping position and are flowed around by the plastics material during injection molding.
8. The method as claimed in development 7, wherein the support core (24) is completely surrounded in the circumferential direction by the clamping punches (64) which comprise teeth (112) which mesh with one another preferably in the clamping position and are moved into the clamping position such that a relevant fixing portion (88) of the support core (24) remains free of plastics material.
9. The method as claimed in one of developments 1 to 8, wherein the support core (24) is centered in the bristle field cavity (50) by means of the bristle field mold parts (48), preferably by means of support elements (74) which protrude in the direction toward the interior of the bristle field cavity (50), at several support points (38) which are spaced apart from one another in the longitudinal direction (22).
10. The method as claimed in development 9, wherein the support core (24) is centered by means of the support elements (74) between bristles (20) which are to be formed and are spaced apart from one another in the longitudinal direction (22).
11. The method as claimed in development 9 or 10, wherein the support elements (74) protrude by between 0.08 mm and 0.16 mm and preferably by between 0.1 mm and 0.14 mm.
12. The method as claimed in one of developments 9 to 11, wherein during the injection molding of the plastics material, a film of plastics material with a thickness of between 0.01 mm and 0.03 mm and preferably between 0.015 mm and 0.025 mm is formed between the support element (74) and the support core (24).
13. The method as claimed in one of developments 9 to 12, wherein the support core (24) is supported by means of the support elements (74) which follow one after another—in the longitudinal direction (22)—offset in an angular manner in each case preferably by at least approximately 90°.
14. The method as claimed in one of developments 1 to 13, wherein the support core (24) is formed by a metal wire, in particular a spring steel wire.
15. The method as claimed in one of developments 1 to 14, wherein the layer is realized in such a manner that it forms a casing of the support core (24) in the region of the bristle-carrying stem (18).
16. The method as claimed in development 2 and at all events as claimed in one of developments 3 to 15, wherein the bristle field mold parts (48), and where applicable the neck mold parts (56), which are moved into the closed state, are moved, together with the support core (24) which is inserted into the bristle field cavity (50) and fixed, to a handle cavity (68) with handle mold parts (66) of the injection mold (42) which form a handle cavity opening (70) such that the bristle field cavity opening (54) or a further neck cavity opening (62) and the handle cavity opening (70) lie closely together.
17. The method as claimed in development 16, wherein the plastics material is injected into the handle cavity (68) and from said cavity is introduced through the handle cavity opening (70) into the bristle field cavity (50), where applicable into the neck cavity (58) and through the same into the bristle cavity (50).
18. A brush, in particular an interdental brush produced according to the method as claimed in one of the developments 1 to 17, which comprises a bristle-carrying stem (18) with an elongated support core (24) and a bristle field (26) with bristles (20) which protrude from the bristle-carrying stem (18), wherein a layer of plastics material is injected onto the support core (24), preferably to form a casing (28), and the bristles (20) which protrude from the layer are injected integrally with the layer.
19. The brush as claimed in development 18, wherein a fixing portion (88) of the support core (24) which lies outside the bristle field (26) is exposed at least in part, preferably completely.
20. The brush as claimed in development 18 or 19, wherein the support core (24) is partially exposed at support points (38) in the region of the bristle field (26) or is only coated by a plastics material film which, compared to the remaining regions of the layer or casing (28), is thin.
21. The brush as claimed in one of developments 18 to 20, wherein the bristles (20) protrude at least approximately radially from the bristle-carrying stem (18), in rows (34) of bristles which extend in the longitudinal direction (22) and are distributed in the circumferential direction, preferably in a uniform manner and are arranged in bristle planes (36) which extend at right angles to the longitudinal direction (22) and are preferably spaced apart at a constant spacing.
22. A injection mold for producing a brush, in particular an interdental brush (10), according to the method as claimed in one of developments 1 to 17, having at least two bristle field mold parts (48) which—in the closed state—define a bristle field cavity (50) for producing the bristle-carrying stem (18) and the bristles (20), wherein on one end face (52), the bristle field cavity (50) comprises a bristle field cavity opening (54), through which an elongated support core (24) is insertable in the longitudinal direction (22) into the bristle field cavity (50), and having a fixing element (64') for fixing the support core inserted into the bristle field cavity (50).
23. The injection mold as claimed in development 22, wherein there are two neck mold parts (56) which define a neck cavity (58) with a neck cavity opening (60), wherein the fixing element (64') is associated with the neck mold parts (56) and—in the closed state of the injection mold (42)—the neck cavity opening (60) is arranged at the bristle field cavity opening (54).
24. The injection mold as claimed in development 23, wherein in the closed position there is a handle cavity (68) with handle mold parts (66) which define a handle cavity opening (70), wherein the bristle field mold parts (48), which are moved into the closed state, can be moved together with the support core inserted into the bristle field cavity (50) and the neck mold parts (56) to the handle mold parts (66) such that the bristle field cavity (50), the neck cavity (58) and the handle cavity (68) together realize an injection cavity (72).

The invention claimed is:
1. An interdental brush comprising:
a handle having a flattened shape and comprising at least one trough-shaped indentation on at least one of an upper side and an under side;
a bristle-carrying stem which defines a longitudinal direction and has an elongated support core;
a bristle field comprising bristles which protrude from the bristle-carrying stem, the bristles formed from an integral layer disposed on the support core; and
a neck element which connects the support core to the handle,
wherein the handle, the support core and the neck element are integrally molded from a first plastics material component,
the integral layer is formed from a second plastics material component that at least partially covers the handle and the neck element, and is at least partially disposed in the at least one trough-shaped indentation of the handle, and
the at least one trough-shaped indentation is partially surrounded by an edge which merges into a channel-like indentation of the neck element.
2. The interdental brush as claimed in claim 1, wherein the at least one trough-shaped indentation is provided with a structure.
3. The interdental brush as claimed in claim 2, wherein the structure is arranged on an edge or on a bottom of the at least one trough-shaped indentation.
4. The interdental brush as claimed in claim 2, wherein the structure includes at least one of nubs, grooves, and lamellae.
5. The interdental brush as claimed in claim 1, wherein the at least one trough-shaped indentation is at least one of closed and open, and
if the trough-shaped indentation is closed, an edge of the trough-shaped indentation is continuous, and, if the trough-shaped indentation is open, at least at one end of the trough-shaped indentation is open.
6. The interdental brush as claimed in claim 1, wherein the integral layer is disposed on the support core flush with the neck element.
7. The interdental brush as claimed in claim 1, wherein the neck element is fully covered by the second plastics material component.
8. The interdental brush as claimed in claim 1, wherein a length of the brush is in a range of 35 to 70 mm.

9. The interdental brush as claimed in claim 1, wherein a height of the brush is in a range of 0.8 to 2.8 mm.

10. The interdental brush as claimed in claim 1, wherein the handle includes at least one through hole.

11. The interdental brush as claimed in claim 10, wherein the at least one through hole is provided in the at least one trough-shaped indentation of the handle.

12. The interdental brush as claimed in claim 10, wherein a further plastics material component is disposed in at least one of the at least one trough-shaped indentation and the at least one through hole.

13. The interdental brush as claimed in claim 1, wherein the second plastics material component is injected onto a rear end of the handle, remote from the neck element, and the second plastics material component overlaps a large part of a surface of the handle, while covering a substantial part of a surface on a rear side of the neck element and covering a surface of the support core completely or on all sides except a bottom side.

14. The interdental brush as claimed in claim 1, wherein a width of the brush is between 3 and 12 mm.

15. The interdental brush as claimed in claim 1, wherein a width of the brush is between 5 and 8 mm.

16. An interdental brush comprising:

a handle;

a bristle-carrying stem which defines a longitudinal direction and has an elongated support core;

a bristle field comprising bristles which protrude from the bristle-carrying stem, the bristles formed from an integral layer disposed on the support core; and a neck element comprising a longitudinal, channel-like indention and which connects the support core to the handle, wherein the handle, the support core and the neck element are integrally molded from a first plastics material component, the integral layer is formed from a second plastics material component that at least partially covers the handle and the neck element, and is at least partially disposed in the longitudinal, channel-like indention of the neck element, and the support core is not surrounded or is only surrounded in part by the layer.

17. The interdental brush as claimed in claim 16, wherein the support core has a diameter that is smaller than a diameter of the neck element.

18. The interdental brush as claimed in claim 16, wherein the handle has a plate-like shape and comprises trough-shaped indentations on at least one of an upper side and an under side.

19. The interdental brush as claimed in claim 18, wherein the second plastics material component extends from the trough-shaped indentations of the handle through the channel-like indention of the neck element up to the support core to form the integral layer with the bristles.

* * * * *